(12) United States Patent
Doshi et al.

(10) Patent No.: US 9,102,076 B2
(45) Date of Patent: Aug. 11, 2015

(54) METHODS FOR MAKING AEROGEL COMPOSITES

(75) Inventors: Dhaval Arun Doshi, Lexington, MA (US); Thomas Michael Miller, Holden, MA (US); Joshua Harby Chase, Arlington, MA (US); Catherine Meryl Norwood, Somerville, MA (US)

(73) Assignee: Cabot Corporation, Boston, MA (US)

( * ) Notice: Subject to any disclaimer, the term of this patent is extended or adjusted under 35 U.S.C. 154(b) by 868 days.

(21) Appl. No.: 12/951,323

(22) Filed: Nov. 22, 2010

(65) Prior Publication Data

US 2011/0206471 A1    Aug. 25, 2011

Related U.S. Application Data

(60) Provisional application No. 61/264,352, filed on Nov. 25, 2009, provisional application No. 61/296,183, filed on Jan. 19, 2010.

(51) Int. Cl.

| | |
|---|---|
| *B28B 3/02* | (2006.01) |
| *C04B 14/06* | (2006.01) |
| *C04B 14/30* | (2006.01) |
| *C04B 28/02* | (2006.01) |
| *C04B 111/28* | (2006.01) |
| *C04B 111/40* | (2006.01) |
| *C04B 111/52* | (2006.01) |

(52) U.S. Cl.
CPC .............. *B28B 3/02* (2013.01); *C04B 14/064* (2013.01); *C04B 14/302* (2013.01); *C04B 28/02* (2013.01); *C04B 2111/28* (2013.01); *C04B 2111/40* (2013.01); *C04B 2111/52* (2013.01); *Y10T 408/03* (2015.01)

(58) Field of Classification Search
USPC .................................. 264/259, 319, 333, 256
See application file for complete search history.

(56) References Cited

U.S. PATENT DOCUMENTS

| | | | | |
|---|---|---|---|---|
| 5,631,097 | A | * | 5/1997 | Andersen et al. ............. 428/703 |
| 5,641,584 | A | * | 6/1997 | Andersen et al. ............. 428/703 |
| 5,786,059 | A | | 7/1998 | Frank et al. |
| 5,789,075 | A | | 8/1998 | Frank et al. |
| 5,866,027 | A | | 2/1999 | Frank et al. |
| 5,904,763 | A | | 5/1999 | Blocken |
| 6,080,475 | A | * | 6/2000 | Frank et al. ................... 428/331 |
| 6,143,400 | A | | 11/2000 | Schwertfeger et al. |

(Continued)

FOREIGN PATENT DOCUMENTS

| | | |
|---|---|---|
| CA | 2 231 428 A1 | 3/1997 |
| CN | 1196036 A | 10/1998 |

(Continued)

OTHER PUBLICATIONS

International Search Report, mailed on Jun. 30, 2011, from counterpart International Application No. PCT/US2010/057576, filed on Nov. 22, 2010.

(Continued)

*Primary Examiner* — Benjamin Schiffman

(57) ABSTRACT

Composites such as self-supporting rigid composites that include aerogel have low thermal conductivity and attractive mechanical properties. Methods for preparing such composites include, for example, combining an aerogel-containing material with a binder to form a slurry and allowing the slurry to harden. At least part of the hardening process in conducted under compression.

21 Claims, 6 Drawing Sheets

EXAMPLE OF "SANDWICH"

(56) References Cited

U.S. PATENT DOCUMENTS

| | | |
|---|---|---|
| 6,709,600 B2 | 3/2004 | Hrubesh et al. |
| 6,887,563 B2 | 5/2005 | Frank et al. |
| 2001/0034375 A1 | 10/2001 | Schwertfeger et al. |
| 2005/0046086 A1 | 3/2005 | Lee et al. |
| 2005/0167891 A1 | 8/2005 | Lee et al. |
| 2006/0125158 A1 | 6/2006 | Rouanet et al. |
| 2006/0272727 A1 | 12/2006 | Dinon et al. |
| 2012/0037838 A1 | 2/2012 | Bauer et al. |
| 2012/0097907 A1 | 4/2012 | Bauer et al. |

FOREIGN PATENT DOCUMENTS

| | | |
|---|---|---|
| DE | 44 41 567 A1 | 5/1996 |
| DE | 195 33 564 A1 | 3/1997 |
| JP | H10-504792 A | 5/1998 |
| JP | H10-509940 A | 9/1998 |
| JP | H11-513349 A | 11/1999 |
| JP | 2009-512764 A | 3/2009 |
| WO | 94/20274 A1 | 9/1994 |
| WO | WO 94/20274 * | 9/1994 |
| WO | 2007/047970 A2 | 4/2007 |
| WO | 2009/134992 A2 | 11/2009 |

OTHER PUBLICATIONS

International Preliminary Report on Patentability and Written Opinion of the International Seraching Authority for International Application No. PCT/US2010/057576, mailed on Jun. 7, 2012.

English language translation of the first Office Action, from counterpart Chinese Application No. 201080062308.9, Aug. 22, 2014.

English language translation of the second Office Action, from counterpart Chinese Application No. 201080062308.9, May 6, 2014.

English language translation of the first Office Action, from counterpart Japanese Application No. 2012-541136, May 13, 2014.

English language translation of the Final Rejection issued Sep. 4, 2014, from counterpart Chinese Application No. 201080062308.9.

Office Action (decision for grant), dated Feb. 10, 2015, from counterpart Japanese Application No. 2012-541136.

English overview of the Office Action (decision for grant) dated Feb. 10, 2015, from counterpart Japanese Application No. 2012-541136.

English language translation of the Notification of Reexamination, issued Apr. 30, 2015, from counterpart Chinese Application No. 201080062308.9.

* cited by examiner

~3 min in the flame    5-10 min in the flame

EXAMPLE OF ROUTED EDGES  FIG. 2A

EXAMPLE OF PAINTED SURFACE

EXAMPLE OF "SANDWICH"

METHODS FOR MAKING AEROGEL COMPOSITES

RELATED APPLICATIONS

This application claims the benefit under 35 U.S.C. §119 (e) of U.S. Provisional Patent Application No. 61/264,352, filed on Nov. 25, 2009, and U.S. Provisional Patent Application No. 61/296,183, filed on Jan. 19, 2010, both of which are incorporated herein by reference in their entirety.

BACKGROUND OF THE INVENTION

Many applications benefit from materials that are relatively light and that combine desired mechanical properties and insulating characteristics. Trends in the construction industry and other fields also favor articles that are simple to manufacture and use. Thus a continued need exists for such materials, articles and methods for their manufacture and use.

SUMMARY OF THE INVENTION

The invention generally relates to composites that include aerogel, methods for making and methods and articles using such composites. Generally, the composites described herein have a thermal conductivity (at 23° C. and 1 atmosphere) that is no greater than about 50 mW/(m·K), e.g., within the range of from about 20 to about 30 mW/(m·K), for example 26 mW/(m·K), and can be less than or equal to 20 mW/(m·K). The composites can be further characterized by their mechanical properties.

In one embodiment, for instance, the invention is directed to a self supporting rigid composite that includes an aerogel-containing material, for example in particulate form, and a binder, for instance an inorganic, e.g., cementitious, binder. In specific implementations, the self supporting rigid composite has a thermal conductivity no greater than about 30 mW/(m·K), e.g., 26 mW/(m·K) or less, for example 20 mW/(m·K) measured according to ASTM C518, and can be further characterized by one or more mechanical properties such as, for example, its compressive strength, flexural strength, and/or elastic modulus. In some implementations, the self supporting rigid composite includes one or more other ingredients, such as, e.g., surfactants, fibers, opacifiers, fire retardants and so forth.

In another embodiment, the invention is directed to a method for producing a composite. The method comprises: combining aerogel particles, a binder and, optionally, one or more other ingredients, e.g., opacifiers, surfactants, fire retardants, fibers and so forth, to form a slurry; shaping or applying the slurry; and allowing the slurry to harden, thereby producing the composite. In many aspects of the invention, at least part of the hardening cycle is conducted under compression. When fibers or other filamentary materials are employed, some aspects of the invention favor a narrow fiber length distribution, which, in many instances, is shifted towards higher values of fiber length.

In one implementation, a method for producing a self supporting rigid composite includes: combining aerogel particles and a binder to form a slurry; shaping the slurry; and allowing the shaped slurry to harden, wherein at least part of the hardening process is conducted under compression, thereby producing a self supporting rigid composite having: a thermal conductivity that is no greater than about 50 mW/m·K at 23° C. and 1 atmosphere; and one or more mechanical properties selected from the group consisting of: (i) a flexural strength greater than about 0.05 MPa; (ii) a compressive strength greater than about 0.1 MPa; and (iii) an elastic modulus greater than about 0.5 MPa.

In another implementation, a method for producing a self supporting rigid composite includes: combining an aerogel-containing material and a binder to form a slurry; combining a filamentary material with the slurry through a mixing process that substantially preserves an initial filament length characterizing the filamentary material, thereby forming a mixture; shaping the mixture; and allowing mixture to harden, wherein at least part of the hardening process is conducted under compression, thereby producing the self supporting rigid composite.

In a further implementation, a method for producing a rigid composite includes: combining an aerogel-containing material and a binder to form a slurry; combining a filamentary material with the slurry through a mixing process that substantially preserves an initial filament length characterizing the filamentary material, thereby forming a mixture; applying the mixture to a substrate or into an opening; and allowing the mixture to harden, thereby forming the rigid composite, wherein the rigid composite has a thermal conductivity that is no greater than about 50 mW/m·K at 23° C. and 1atmosphere; and one or more mechanical properties selected from the group consisting of: (i) a flexural strength greater than about 0.05 MPa; (ii) a compressive strength greater than about 0.1 MPa; and (iii) an elastic modulus greater than about 0.5 MPa.

In yet another implementation, a method for producing a rigid composite includes: combining aerogel particles and a binder to form a slurry; applying the slurry onto a surface or into an opening; and allowing the applied slurry to harden, wherein at least part of the hardening process is conducted under compression, thereby producing a rigid composite having: a thermal conductivity that is no greater than about 50 mW/m·K at 23° C. and 1 atmosphere; and one or more mechanical properties selected from the group consisting of: (i) a flexural strength greater than about 0.05 MPa; (ii) a compressive strength greater than about 0.1 MPa; and (iii) an elastic modulus greater than about 0.5 MPa.

In further embodiments the invention is directed to uses of aerogel-containing composites, for instance self-supporting and/or rigid composites having characteristics disclosed herein, in various articles and/or applications further described below.

The invention has many advantages. Composites described herein, for example, are easily made and simple to use, providing excellent properties in the construction industry and in other end-use applications. By combining several attractive properties, these composites reduce the overall number of conventional materials or articles typically needed, simplifying construction and manufacturing processes. In many cases, the presence of aerogel can reduce the overall weight of the material, an important consideration in many construction projects. Alternatively or additionally, the presence of aerogel can reduce bulk, e.g., thickness of insulation, without sacrificing insulating properties. Combining thermal and mechanical properties in a composite such as described herein can result in load bearing insulating articles and can reduce or minimize the need for other mechanical supports, e.g., metal supports that can conduct heat and thus diminishing the overall insulation. Hydrophobic properties associated with some of the composites disclosed herein can be exploited in applications that involve wet environments. In many cases, composites described herein have excellent flame resistance properties and/or attractive acoustic properties for sound or noise reduction applications.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A is a photograph of a composite sample according to the invention having a routed surface and edges.

DETAILED DESCRIPTION OF THE PREFERRED EMBODIMENTS

Figure 1B:
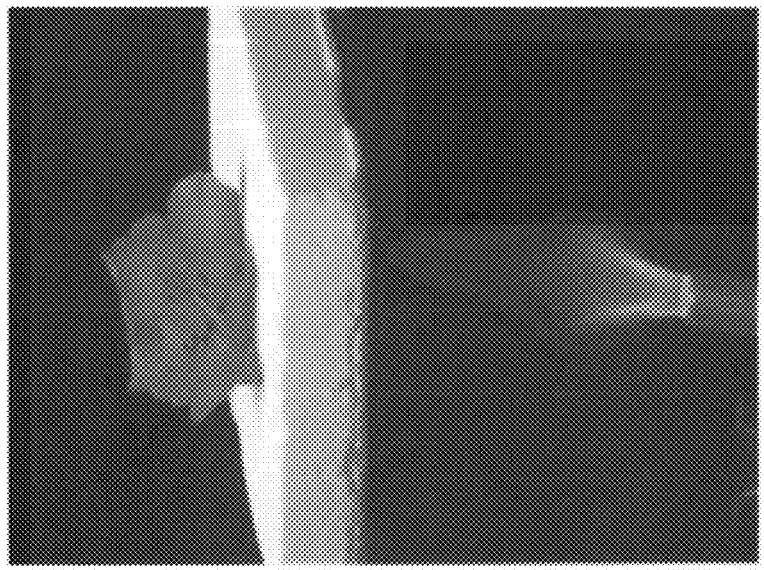
FIGS. 1A and 1B are illustration of a flame test designed to determine fire characteristics of composites according to the invention.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

The invention generally relates to composites, methods for making and articles and methods employing composites. As used herein, the term "composite" refers to a material which has structural or functional properties that differ from the properties of the substances employed to form the composite.

In specific embodiments the invention the composite is solid, for instance rigid, i.e., an object or material that undergoes no visible deformation under the force of its own weight. In specific implementations, the composite is self supporting, i.e., is capable of sustaining or carrying its own weight. Examples of self-supporting rigid composites according to aspects of the invention are shown in the figures.

Generally, the composite includes an aerogel-containing material, i.e., a material that consists of, consists essentially of, or comprises an aerogel.

Aerogels are low density porous solids that have a large intraparticle pore volume and typically are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using ambient pressure, also referred to as non-supercritical drying process. When applied, for instance, to a silica-based wet gel, surface modification, e.g., end-capping, carried out prior to drying, prevents permanent shrinkage in the dried product. The gel can still shrink during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, in many instances about 0.03 to 0.3 g/cm$^3$), very high surface areas (generally from about 300 to about 1,000 square meters per gram (m$^2$/g) and higher, for example from about 600 to about 1000 m$^2$/g), high porosity (about 90% and greater, e.g., greater than about 95%), and a relatively large pore volume (e.g., about 3 milliliter per gram (mL/g), for example, about 3.5 mL/g and higher, for instance, 7 mL/g). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 mW/m-K, at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendritic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

In many implementations, the aerogel employed is hydrophobic. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found, for example, in U.S. Pat. No. 6,709,600 B2 issued to Hrubesh et al. on Mar. 23, 2004, the teachings of which are incorporated herein by reference in their entirety.

Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl)propyl}tetrasulfide, hexamethyldisilazane and combinations thereof.

In some examples, the aerogel has a hydrophilic surface or shell obtained, for example, by treating hydrophobic aerogel with a surface active agent, also referred to herein as surfactant, dispersant or wetting agent.

Increasing the amount of surfactant tends to increase the depth to which the aqueous phase can penetrate and thus the thickness of the hydrophilic coating surrounding the hydrophobic aerogel core.

The aerogel-containing material can include additives such as fibers, opacifiers, color pigments, dyes and mixtures thereof can be present in the aerogel component. For instance, a silica aerogel can be prepared to contain fibers and/or one or more metals or compounds thereof. Specific examples include aluminum, tin, titanium, zirconium or other non-siliceous metals, and oxides thereof. Non-limiting examples of opacifiers include carbon black, titanium dioxide, zirconium silicate, and mixtures thereof. Additives can be provided in any suitable amounts, e.g., depending on desired properties and/or specific application.

Specific implementations employ aerogel-containing materials in particulate form, e.g., aerogel granules, pellets, beads, powders. Particles employed can have any particle size suitable for an intended application. For instance, the aerogel particles can be within the range of from about 0.01 microns to about 10.0 millimeters (mm) and can have, for example, a mean particle size in the range of 0.3 to 3.0 mm. In many implementations larger particles are preferred. Also preferred are aerogel particles having a particle size distribution (PSD) that promotes efficient packing.

Examples of commercially available aerogel materials in particulate form are those supplied under the tradename of Nanogel® by Cabot Corporation, Billerica, Mass. Nanogel® aerogel granules have high surface area, are greater than about 90% porous and are available in a particle size ranging, for instance, from about 8 microns (μm) to about 10 mm. Specific grades of translucent Nanogel® aerogel include, for instance, those designated as TLD302, TLD301 or TLD100; specific grades of IR-opacified Nanogel® aerogel include, e.g., those under the designation of RGD303 or CBTLD103; specific grades of opaque Nanogel® aerogel include, for instance, those designated as OGD303.

The aerogel-containing material, preferably in particulate form, can also be derived from a monolithic aerogel or aerogel based composite, sheet, blanket and so forth. For example, pieces of such aerogel materials can be obtained by breaking down, chopping, comminuting or by other suitable techniques through which aerogel particles can be obtained from aerogel monoliths, composites, blankets, sheets and other such precursors.

Examples of materials that can be processed to produce particles or pieces of aerogel-containing material suitable for the self supporting rigid composites described herein include aerogel-based composite materials, such as those including aerogel and fibers (e.g., fiber-reinforced aerogels) and, optionally, at least one binder. The fibers can have any suitable structure. For example, the fibers can be oriented in a parallel direction, an orthogonal direction, in a common direction or a random direction. There can be one or more types of fibers. The fibers can be different in terms of their composition, size or structure. In the composite, the one type of fibers can be in different dimensions (length and diameter) and their orientation can be different. For example long fibers are in plane aligned whereas smaller fibers are randomly distributed. Specific examples are described, for instance, in U.S. Pat. No. 6,887,563, issued on May 3, 2005 to Frank et al., the teachings of which are incorporated herein by reference in their entirety. Other examples include at least one aerogel and at least one syntactic foam. The aerogel can be coated to prevent intrusion of the polymer into the pores of the aerogel, as described, for instance in International Publication No. WO 2007047970, with the title Aerogel Based Composites, the teachings of which are incorporated herein by reference in their entirety. In yet other examples, the aerogel can derive from a blanket, e.g., arrangements in which blanket sheets are laminated together to form a multilayer structures. Described in U.S. Pat. No. 5,789,075, issued on Aug. 4, 1998 to Frank et al., the teachings of which are incorporated herein by reference in their entirety, are a cracked monoliths and these also can serve as suitable precursor in producing the self supporting rigid composite disclosed herein. In further examples the aerogel employed includes a composite of an aerogel material, a binder and at least one fiber material as described, for instance, in U.S. Pat. No. 6,887,563, issued on May 3, 2005 to Frank et al., the teachings of which are incorporated herein by reference in their entirety. Other suitable examples of aerogel material that can be used are fiber-web/aerogel composites that include bicomponent fibers as disclosed in U.S. Pat. No. 5,786,059 issued on Jul. 28, 1998 to Frank et al., the teachings of which are incorporated herein by reference in their entirety. The aerogel particles also can be derived from sheets or blankets produced from wet gel structures, as described, for instance, in U.S. Patent Application Publication Nos. 2005/0046086 A1, published Mar. 3, 2005, and 2005/0167891 A1, published on Aug. 4, 2005, both to Lee et al., the teachings of which are incorporated herein by reference in their entirety. Commercially, aerogel-type blankets or sheets are available from Cabot Corporation, Billerica, Mass. or from Aspen Aerogels, Inc., Northborough, Mass.

Combinations of aerogel-containing materials also can be employed. For instance, the self-supporting rigid composites described herein can utilize different types of aerogel-containing materials e.g., combinations or mixtures of granular aerogels having different particle sizes and/or light transmitting properties. In one example, the mixture employed includes TLD302 and TLD203 Nanogel® aerogels.

Aerogel-containing material can be present in the composite in any suitable amount. In some examples, it is present in the composition in an amount within the range of from about 40 to about 95 volume %, for instance in an amount within the range of from about 60 to about 95 volume %. Significant mechanical properties, for example, are observed in some composites that contain more than 90 volume percent aerogel-containing material.

In terms of weight percentages, the aerogel-containing material can be present in the composite in amounts within the range of from about 5% to about 95% by weight, for instance within the range of from about 30 to about 90% by weight. In some implementations the composition has a high level of aerogel loading, i.e., at least 50% by weight. In specific examples, the aerogel-containing material is present in the in an amount within the range of from about 50 weight % to about 75 weight %.

In specific aspects of the invention, the composite, preferably a self supporting rigid composite, also includes a binder. In many examples, the binder is a material that, under certain conditions, becomes stiff, sets, dries, hardens or is cured (e.g., via polymerization reaction). For convenience, these and similar such processes are referred to herein as "hardening". In many cases, these "hardening" processes are irreversible and results in a solid composite that includes aerogel-containing material and the binder. The binder links the aerogel particles together and may also optionally link other ingredients.

Organic as well as inorganic binders can be employed. Examples of organic binders include, but are not limited to acrylates and other latex compositions, epoxy polymers, polyurethane, polyethylene polypropylene and polytetrafluoroethylene polymers, e.g., those available under the designation of Teflon™. Examples of inorganic binders include but are not limited to cementitious materials such as, for instance, cement, lime, gypsum, or combinations thereof. Other inorganic materials that can be employed include mixed magnesium salts, silicates, e.g., sodium silicate, and so forth.

Among inorganic binders, cements typically include limestone, clay and other ingredients, such as, hydrous silicates of alumina. Hydraulic cements, for instance, are materials that set and harden after being combined with water, as a result of chemical reactions with the mixing water, and that, after hardening, retain strength and stability even under water. An important requirement for this strength and stability is that the hydrates that are formed on immediate reaction with water are essentially insoluble in water. Setting and hardening of hydraulic cements is caused by the formation of water-containing compounds, which result from reactions between cement components and water. The reaction and the reaction products are referred to as hydration and hydrates or hydrate phases, respectively. As the immediate onset of the reactions begins, stiffening can be observed which is initially slight but which increases with time. The point at which the stiffening reaches a certain level is referred to as the start of setting. Further consolidation is called setting, after which the hardening phase begins. The compressive strength of the material then grows steadily, over a period that ranges from a few days in the case of "ultra-rapid-hardening" cements to several years in the case of ordinary cements.

Gypsum plaster is a type of building material based on calcium sulfate hemihydrate ($CaSO_4.0.5H_2O$). Typically plaster starts as a dry powder that is mixed with water to form a paste which liberates heat and then hardens. Unlike mortar or cement, plaster remains quite soft after drying, and can be easily manipulated with metal tools or sandpaper. Lime plaster is a mixture of calcium hydroxide and sand (or other inert fillers). Carbon dioxide in the atmosphere causes this type of plaster to set by transforming the calcium hydroxide into calcium carbonate.

In some implementations of the invention, a material can act as a binder and also provides other functions, e.g., surface active properties. Such materials are referred to herein as "multi-functional". Some examples of materials believed to be multi-functional include acrylates.

The binder can be combined with the aerogel-containing material in any suitable ratio. Examples include but are not limited to aerogel to binder volume ratios within the range of about 150 to about 5, e.g., within the range of from about 150 to about 10, for instance in the range of 90 to 30.

In specific implementations, the binder is provided in a binder-containing composition such as, a mortar formulation, e.g., a grout formulation, a plaster formulation, and any combination thereof. Such binder-containing compositions can include one or more of additives as further described below.

Typically mortars are agents used to bond bricks, stone, tiles, concrete blocks and the like into a structure and typically include sand and cement, e.g., masonry, Portland cements, oxychloride cements, and others. With water, the sand-cement mixture forms a plastic, workable mixture that later sets or hardens. In general, mortars function with a calcium silicate-based chemistry similar to that of concrete but, unlike concrete, they tend not to include coarse aggregates. A thin mortar, e.g., of cement, lime, or gypsum, often with other ingredients such as sand and water, used in tile work or to fill crevices such as found in masonry joints or other fissures, in order to consolidate adjoining parts into a solid mass, often is referred to as "grout".

Plaster generally refers to a mixture of gypsum or lime with sand that, with water, forms a paste-like material which can be applied in its plastic state directly to bricks or to other surfaces used for ceilings, interior walls or to the exterior of buildings, in which case it is also known as "stucco". As water evaporates the material forms a hard lining onto the surface being covered or coated.

Mortar, e.g., grout, formulations as well as plaster formulations often include additional compounds that serve as accelerators, retarders, plasticizers, air entrainment compounds, pigments, binders, pumping aids and so forth.

Accelerators, for instance, speed up the hydration (hardening) of the concrete. Examples of typical materials used are $CaCl_2$ and NaCl. Retarding agents slow the hydration of concrete, and are used in large or difficult pours where partial setting before the pour is complete is undesirable. A typical retarder is sugar ($C_6H_{12}O_6$).

Air entrainment agents add and distribute tiny air bubbles in the concrete, which will reduce damage during freeze-thaw cycles, thereby increasing the concrete's durability. Often, entrained air presents a trade-off with strength, as each 1% of air may result in 5% decrease in compressive strength.

Plasticizers (water-reducing admixtures) increase the workability of plastic or "fresh" concrete, allowing it to be placed more easily, with less consolidating effort. Superplasticizers (high-range water-reducing admixtures) are a class of plasticizers which have fewer deleterious effects when used to significantly increase workability. Alternatively, plasticizers can be used to reduce the water content of a concrete (and have been called water reducers due to this application) while maintaining workability. This can improve strength and durability characteristics.

Pigments can be used to change the color of concrete, for aesthetics. A typical example is titanium dioxide ($TiO_2$). Corrosion inhibitors are used to minimize the corrosion of steel and steel bars in concrete. Bonding agents are used to create a bond between old and new concrete. Pumping aids improve pumpability, thicken the paste, and reduce dewatering (the tendency for the water to separate out of the paste).

Other compounds that can be present in the mortar, e.g., grout, or plaster formulation include tensides, cellulose, organic polymers, e.g., acrylates, and so forth.

Suitable mortar, e.g., grout, or plaster formulations that can be utilized include those commercially available for specific application such as, for instance, joining dry wall panels, tile or brick work, façade covering, interior or exterior plastering and many others, as known in the art. In one implementation, the mortar (grout) composition is a formulation in accordance with European Standard EN 13888. One example is a grout formulation available in Europe under the designation "Fugenweiβ" (Mortier de jointoiement blanc or Impasto sigillante per giunti blanco) manufactured by SAKRET Trockenbaustoffe Europa GmbH & Co. KG, Otto-von-Guericke-Ring 3, D-65205 Wiesbaden, Germany. Another suitable grout formulation that is commercially available is a grout polyblend from Custom Building Products, USA. Customized mortar, e.g., grout, or plaster formulations also can be employed. Simplefix Premixed Adhesive and Grout, manufactured by Custom Building Products, CA, USA, Waterplug Hydraulic Cement, manufactured by Thoro Consumer Products, BASF Construction Chemicals, OH, USA, Elmer's Probond Concrete Bonder, manufactured by Elmer's Products, Inc., OH, USA, Thorocrete, manufactured by Thoro Consumer Products, BASF Construction Chemicals, OH, USA are other non-limiting examples of grout formulations that can be employed.

Some aspects of the invention employ one or more surfactants. Suitable surfactant can be selected from ionic (anionic and cationic) surfactants, amphoteric surfactants, nonionic surfactants, high molecular surfactants, and high molecular compounds and so forth. Combinations of different types of surfactants also can be utilized.

Anionic surfactants can include, for example, alkyl sulfates and higher alkyl ether sulfates, more specifically, ammonium lauryl sulfate, and sodium polyoxyethylene lauryl ether sulfate. Cationic surfactants include, for instance, aliphatic ammonium salts and amine salts, more specifically, alkyl trimethylammonium, and polyoxyethylene alkyl amine, for example. Amphoteric surfactants may be of betain type, such as alkyl dimethyl betain, or of oxido type, such as alkyl dimethyl amine oxido, for example. Nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others Specific examples of surfactants that can be employed include but are not limited to Pluronic P84, PE6100, PE6800, L121, Emulan EL, Lutensol FSA10, Lutensol XP89 all from BASF, MP5490 from Michelmann, AEROSOL OT (sodium di-2-ethylhexylsulfosuccinite), BARLOX 12i (a branched alkyldimethylamine oxide), LAS (linear alkylbenzene sulfonates) and TRITON 100 (octylphenoxypolyethoxy(9-10) ethanol), TWEEN surfactants like TWEEN 100 surfactant, and BASF pluronic surfactants and others. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids), alcohol ethoxylates, alcohol alkoxylates, ethylene oxide/propylene oxide block copolymers, polyoxyethylene derivatives of sorbitan esters or combinations thereof.

The surfactant can be provided independently or as part of the binder-containing composition. In some examples surfactant or surface active properties present in the binder-containing composition can be supplemented with independently added surfactant that can be the same or a different compound or mixture of compounds.

Specific implementations of the composite include fibers. If used, fibers can increase mechanical properties of a finished product. In some cases, they may also contribute to a loss of thermal insulation.

Fibers typically have elongated, e.g. cylindrical, shapes with length to diameter aspect ratios that are greater than 1, for instance greater than 5, e.g., greater than 8. In many examples suitable fibers have a length to diameter ratio of at least 20. The fibers can be woven, non-woven, chopped, or continuous. Fibers can be mono-component, bi-component, e.g., including a core made of one material and a sheath made of another material, or multi-component. Fibers may be hollow or solid and may have a cross-section that is flat, rectangular, cylindrical or irregular. The fibers may be loose, chopped, bundled, or connected together in a web or scrim. Other ingredients such as mesh or skin can be added to provide reinforcement. In specific examples, typical fiber lengths are within the range of from about 0.5 mm to about 20 mm, e.g., from about 2 mm to about 12 mm. Suitable aspect ratios of the fibers are 1:1000 (diameter to length).

The fibers can be added in any suitable amount and can be inorganic fibers, for example, carbon fibers, mineral wool or glass fibers, polymer-based fibers, metallic, e.g., steel, fibers, cellulose fibers, cotton, wood or hemp fibers and other types of fibers, as known in the art. Combinations of different kinds of fibers also can be utilized. The use of fibers in combination with aerogel or xerogel materials is described, for example, in U.S. Pat. No. 6,143,400, issued Schwertfeger et al. Nov. 7, 2000; U.S. Pat. No. 6,887,563, issued to Frank et al. on May 3, 2005; U.S. Pat. No. 5,866,027 issued to Frank et al. on Feb. 2, 1999; and in U.S. Patent Application Publication 2006/0125158 to Rouanet et al. and published on Jun. 15, 2006.

Alternatively or in addition to fibers, other ingredients can be utilized, e.g., for reinforcement in a final product, to wet the outer surface of aerogel particles, to increase adhesion, light transmission characteristics, visual aspect, or to provide or enhance other properties. Examples include but are not limited to opacifiers, viscosity regulators, curing agents, agents that enhance or slow down the rate at which the binder hardens, agents or materials that promote mechanical strength, viscosity regulators, plasticizers, lubricants, reinforcements, fire retardants, and many others. In specific examples, the composite utilizes silica, including but not limited to fumed silica, colloidal silica or precipitated silica, carbon black and titanium dioxide, perlite, microspheres such as glass, ceramic or polymeric microspheres, silicates, e.g., calcium silicate, copolymers, tensides, mineral powder, film building components, surfactants, fibers and so forth. Combinations of ingredients also can be utilized.

In some examples, such ingredients are provided in addition to the aerogel-containing material, the binder or the binder-containing composition. Amounts employed may depend on specific applications and other factors. Meshes, skins or other structures can be incorporated, e.g., for mechanical reinforcement.

The composite can have specific properties such as thermal conductivity, mechanical, acoustical, e.g., sound reflecting, fire resistance and/or other useful characteristics.

In one example, the composite is rigid and/or self-supporting and has a low thermal conductivity, e.g., a thermal conductivity that is no greater than 50 mW/m·K at 23° C. and 1 atmosphere, for example, no greater than about 30 mW/m·K, e.g., no greater than about 20 mW/m·K, as measured by American Standard Test Method (ASTM) C518 (Standard Test Method for Steady-State Thermal Transmission Properties by Means of the Heat Flow Meter Apparatus). In specific implementations, the thermal conductivity is less than or equal to 26 mW/m·K. Thermal conductivity is an intrinsic property of a material that measures its capacity to sustain heat flow. The symbol used to denote thermal conductivity is k (or lambda, $\lambda$). The reciprocal of thermal conductivity is thermal resistivity, an intrinsic property of a material to resist one-dimensional heat flow. Thermal resistivity has units of m·K/mW (meter times Kelvin divided by milliwatts. In specific examples, the composite has a thermal conductivity measured 23° C. and 1 atmosphere that is within the range of from about 20 mW/m·K to about 30 mW/m·K, e.g., is no greater than 26 mW/m·K.

The density of the solid composite may depend on the additives and/or additive amounts present. High density ingredients such as $TiO_2$ or some types of fibers, for instance, can result in an increase in the density of the composite, compared to a similar composite prepared without these ingredients. In many cases, composites, e.g., self-supporting rigid composites, of the invention can have a density within the range of from about 0.06 to about 0.5 $g/cm^3$, for example, within the range of from about 0.1 to about 0.35 $g/cm^3$, for instance, within the range of 0.15 to 0.25 $g/cm^3$. In other examples, the density of the composite is no greater than about 2.5 $g/cm^3$, e.g., no greater than 1.5 $g/cm^3$, for example no greater than 1 $g/cm^3$.

The composite, e.g., self supporting and rigid, can have mechanical properties suitable for specific applications. In some aspects of the invention, the composite has a compressive strength greater than about 0.1 megaPascals (MPa), for example greater than about 0.5 MPa, and, in some cases greater than about 5 MPa. In specific implementations, the compressive strength is about 1 MPa, about 2 MPa, about 3 MPa or about 4 MPa. Unless otherwise noted, compressive strength refers to the point in the stress-strain curve that displays a break or significant change in the slope of the curve.

In other aspects of the invention, the composite has a flexural strength (measured for instance by guidelines set in ASTM C203), of at least 0.05, for example greater than about 0.1 MPa, e.g., greater than about 0.2 MPa. In specific implementations, the flexural strength is equal to or greater than about 0.45 MPa, equal to or greater than about 0.5 MPa, or equal to or greater than about 1 MPa.

In further aspects of the invention, the composite has an elastic modulus (compressive modulus) greater or equal to about 0.5 MPa, e.g., greater or equal to about 1.3 MPa, and in specific examples, greater or equal to about 2 MPa, about 3 Mpa, about 4 MPa or about 5 MPa. The elastic modulus (E)=S/Y, where S is the compressive stress at strain Y.

In some embodiments the composite combines insulating and load bearing properties. In contrast to many conventional insulating materials that can be crushed or severely deformed in weight bearing applications, requiring separate mechanical supports, insulating composites described herein can bear at least a portion of the weight of objects being insulated.

In many cases, a composite such as the self-supporting rigid composite described above can be used over a significant range of temperatures, e.g., from cryogenic or low temperatures to high temperatures. In specific examples the solid composite has flame resistance and/or fire proofing properties.

The composite also can have properties useful in acoustical applications, e.g., in noise management. In specific examples, the acoustic insulating properties of the composite are primarily based on sound reflection. In comparison, the acoustic insulating properties of a pure aerogel solid are based mainly on sound absorption. The Noise Reduction Class of composites according to the invention can be 0.1 to 0.15.

In some implementations, the composite absorbs energy, for example, as impact protection devices and systems in cars, personal protective equipment, and so forth. As silica aerogels are usually very low density materials, the collapse of the solid network occurs gradually, spreading the force of impact out over a longer time. Additionally, as silica aerogels are an open-pored material, the gas contained within the bulk of the solid is forced outwards as the material collapses. In doing so, the gas must pass through the pore network of the aerogel. The frictional forces caused as a gas passes through a restricted opening are indirectly proportional to the square of the pore diameter. As silica aerogels have very narrow pores (~20-50 nm), gases rapidly passing through the material will absorb a considerable amount of energy. Therefore, the energy of an object impacting a silica aerogel is taken up, at least in part, by the collapse of its solid structure and the release of gas from within the material.

In some cases, the composite can have a specific permeability. Furthermore, the composite can be hydrophobic and can have a desired water repellency, contact angle, water soaking or water adsorption properties.

Aspects of the invention relate to methods for producing a composite, e.g., a rigid self supporting composite such as described above. In typical implementations, a precursor mixture that include an aerogel-containing material, e.g., particulate aerogel, a binder (or binder-containing composition) and optional other ingredients such as described above is allowed to hardened, thereby forming the composite.

To form a dry precursor mixture, ingredients can be combined in one step process or in a desired order and mixed to form a dry blend, utilizing, for example, mixing techniques and/or equipment known in the art. If desired, separate components or separate precursor blends can be made available in a kit.

The precursor mixture also can include a fluid, e.g., a liquid, such as, for instance, an aqueous phase. In turn, an aqueous phase present in the precursor mixture can include materials other than water, such as, for instance, one or more non-aqueous solvents, surfactants, pH modifiers, buffers and so forth. For convenience, a liquid or liquid-containing composition is generally referred to herein as "slurry" and, as used herein, the term "slurry" is meant to include solutions, dispersions, suspensions, pastes and so forth. A slurry can be formed by adding a liquid, e.g., water, an aqueous or a non-aqueous liquid, to a dry precursor mixture, or to one or more components thereof.

In one example, the aerogel-containing material is added to an aqueous phase of surfactant. Other components such as, for instance, a binder and/or fibers can be added prior to and/or during the introduction of the aerogel component. The aerogel component also can be added to a slurry that includes a binder (or binder-containing composition) and/or other ingredients With solid binders, water solutions of the solid binders can be used or can be generated during the preparation process. When combined with hydrophobic aerogel, aqueous binder solutions have the advantage of not infiltrating the pores of the aerogel. In many cases, a dispersion or suspension of the aerogel component in water is facilitated by the presence of a mortar, e.g., grout, or plaster formulation such as described above. A slurry that includes particulate aerogel and a binder such as present in a grout formulation, can be homogeneous with well dispersed aerogel and/or binder.

In specific examples, one or more other ingredient, e.g., fibers, are added to the fluid phase to form a dispersion, suspension or solution which is then combined or incorporated into a slurry precursor or a dry precursor containing the aerogel-containing material. If fibers are employed, adding the fibers to a slurry or liquid precursor can facilitate their dispersion.

Amounts employed can be selected based on the nature of the materials, e.g., particle size or surface area available for exposure to water, air, surfactants and so forth, on mixing techniques, time interval to the setting point of the composition, desired viscosity of the slurry prior to setting, and other parameters.

In some implementations, the precursor mixture includes for example, 70 or 75% by weight Nanogel® type aerogel and 25 or 30% by weight of a grout formulation such as described above. Specific examples of the Nanogel® type aerogel are those available under the designation of TD302, mixtures of TD302 and TLD203 and so forth. Amounts of water added can be selected based on the desired viscosity of the slurry, desired application and/or other factors. For instance, a slurry can include 40% by weight Nanogel® type aerogel, 10% by weight grout formulation and 50% by weight water. In some implementations, the ratio of binder to aerogel (e.g., Fugenweiss grout formulation to Nanogel® type aerogel) is 1 part by weight binder to 5 parts by weight of aerogel.

Surface active agents, pH modifier and other materials can be introduced to tailor slurry properties. Slurry viscosity for instance, can be controlled by the amount of liquid added, mechanical manipulation, addition techniques, e.g., order of added components, continuous, intermittent or a one-step combination of an entire amount of dry and fluid phases, the presence of thinners, and other means known in the art. In many cases the slurry is thixotropic, in other words it becomes more liquid-like (less viscous) under shear forces.

In some instances, the slurry includes additional ingredients that can speed up or retard drying, e.g., curing or hardening of the binder.

Shaking, stirring and/or other techniques can by employed to mix liquid and solid materials. In specific examples, light particles, e.g., aerogel particles, are forced into a liquid phase. In other examples, water droplets are lifted to the lighter particles.

Mixing can be effected by manual stirring or in blenders or mixers such as, for example, cement mixers, hand-held impellers, ribbon blenders and others. Mixers such as those having double ribbon blades, planetary mixers and so forth can be utilized. In some cases, blade design and/or properties, e.g., increased blade sharpness, can reduce the amount of time necessary to complete the mixing process and, in some cases, the properties of the final product.

Parameters such as mixing speed, temperature, degree of shear, order and/or addition rate of the liquid and/or solid materials, and many others can be adjusted and may depend on the scale of the operation, the physical and/or chemical nature of the compounds, and so forth. Mixing techniques can also change (typically reduce) the absolute size of the aerogel particles and also change the size distribution of the aerogel particles, resulting in improved packing efficiency, resulting in improved properties of the composite.

Mixing can be conducted at room temperature or at other suitable temperatures. Typically, the components are combined in ambient air but special atmospheres can be provided.

When fibers or other ingredients in filamentary form are present, mixing can break the filaments into smaller fragments. It was discovered that preserving fiber or filament length resulted in products with enhanced mechanical properties. It was also found that a narrower fiber length distribution, shifted towards higher values of fiber or filament length, could be obtained by a more gentle approach to ingredient dispersion. For example, instead of a vigorous high shear mixing, a low energy, low shear mixing of the fibers with the aerogel slurry preserves the initial length distribution. In some aspects of the invention, the fibers also have a substantially uniform fiber length, i.e., 4 mm to 6 mm.

Air has a thermal conductivity of about 26 mW/m·K. In an ultra-low lambda composite the presence of inter-particle air (as opposed to air trapped within regions that are characterized by smaller dimensions relative to the mean free path of the gas molecules, e.g., the nanopores of the aerogel material) may have, in some cases, a negative effect on the thermal performance of the composite. Since, as described above, some aspects of the invention relate to utilizing particulate aerogel, the amount of inter-particle air can be reduced or minimized by employing techniques that enhance the packing efficiency of the particles. In exemplary composites, inter-particle air is present in an amount no greater than about 40% volume percent. In specific aspects, interparticle air is present in an amount of less than about 30 volume %, for instance, less than about 20% by volume. Methods that result in a reduction in the air volume fraction in the final composite include particle size distribution (PSD) selection/creation, vibratory packing, vacuum packing, use of defoaming agents and others. Use of a wide PSD with the ratio of small and large particles will facilitate efficient packing Spherical or nearly spherical particles can be combined with particles that are non-spherical such as randomly shaped or elongated particles. The PSD can be introduced with the starting aerogel material or can be created during the process for producing the composite, e.g., during mixing, by using, for instance, high shear mixing of aerogel-containing particles.

In some embodiments of the invention, the slurry is shaped by molding (using a suitable mold or form), sculpting, casting, extrusion and the like. Through appropriate physical and/or chemical process(es), referred to herein as "hardening" and including, for instance, one or more of polymer curing, cement setting, water evaporation and so forth, a slurry such as described above gives rise to a composite, e.g., a self supporting rigid composite.

Parameters, such as temperature, time, hardening conditions, humidity, soaking and ramping protocols, special atmospheres, the nature of agents employed to influence these processes, and others factors, can be adjusted and optimized as known in the art or as determined by routine experimentation.

In many cases, a slurry hardens at room temperature. Setting or hardening the slurry also can be conducted at other temperatures such as higher than room temperature, for instance by placing the slurry in an oven, e.g., at a temperature in the range of from about 30° C. to about 90° C. Hardening can be achieved in as little as a few minutes or over longer time interval and precursor mixtures can be formulated for shorter or longer setting times to address specific applications. In many instances, the slurry hardens in a time interval within the range of from about 5 min to about 24 hours, e.g., about half an hour.

Optionally, the hardened product can undergo further processing, for example, it can be dried, e.g., at room temperature or in an oven before or after removal from the mold. Aging, further bake and cooling cycles, shaping, polishing, machining and/or other operations also can be carried out.

At least part of the hardening process is conducted under compression. Compression can be applied during the entire hardening process or for a shorter time period. For instance, compression can be exerted for one or more time intervals while the slurry undergoes hardening.

In one example a slurry is placed in a mold using, for instance, a slurry amount greater (overfill) than the normal amount needed to fill the mold in the absence of squeezing. The sample is compressed by pressing downwards on the slurry, and hardens under compression. Pressures employed can be, for example, within the range of from about 200 pounds per square inch (psi) to about 5 psi, e.g., within the range of from about 100 psi to about 30 psi. The pressure can be maintained at the same level or can be increased or decreased to a different level one or more times during the hardening process. Examples of suitable equipment that can be employed to carry out the drying step under compression include, for instance, Carver style hydraulic press (Model Phi by Pasadena Presses, Pasadena, Calif.).

Composites hardened (dried, set, cured, polymerized, etc.) under compression have been found to have improved mechanical properties compared to composites dried in the absence of compression. Without wishing to be bound by any particular interpretation, it is believed that hardening under compression contribute to air evacuation from a precursor mixture and residual stresses in the aerogel, resulting in a hardened product with improved properties.

Improvement realized by conducting at least a portion of the hardening process under compression can be further enhanced in composites that included narrow fiber length distributions, shifted towards the higher fiber length value, such as, for instance, composites formed by gentle techniques designed to reduce or minimize fiber fragmentation.

In some implementations, composites comprising an aerogel-containing material and having enhanced mechanical properties are obtained by: (i) drying under compression: or, (ii), in cases in which fibers are employed, by processes and/or apparatus that reduce or minimize fiber breakage, preferably resulting in a narrow fiber length distribution, shifted towards the longer fiber length value. In specific examples the composites have enhanced mechanical properties obtained by employing both (i) and (ii).

Once a hardened product (composite) is formed, the pressure is released and, as described above, the object can be subjected to further aging and/or bake cycles and to further processing, e.g., further shaping, polishing, machining and so forth, to produce a finished article. For instance, once compression is removed, the composite can be air dried, e.g., in the mold used to effect the drying.

In addition to shaping a slurry, e.g., by molding, casting, extrusion, sculpting and so forth, slurries can be applied onto a substrate or into an opening through techniques such as painting, spraying, trowel applications and the like, and allowed to harden to form a composite, e.g., a rigid composite such as, for example, a coating or a joining material. Examples of substrates include but are not limited to walls, ceilings, doors, frames, piping, dry wall, facades, insulation boards, e.g., mineral wool boards or bats, finished articles and many other types of surfaces. Examples of openings include crevices, joint openings, enclosures, holes, cavities, cracks and other empty spaces such as those needing insulation in the construction and other industries. In some instances the application process includes pumping the slurry. During the pumping process the slurry can be directed through one or more conduits such as hoses or pipes. Viscosity and/or other parameters can be adjusted to the particular application technique. For instance, paste-like slurries are well suited for trowel applications, while less viscosity may be desired when pumping a slurry. In one implementation, the slurry being applied includes a filamentary material, e.g., fibers, and is produced via a mixing process that substantially preserves the initial filament length of the filamentary material.

During some application processes, such as, for example, certain forms of pumping or spraying, the slurry is compressed, e.g., by using a positive pressure or compaction. Without wishing to be held to a particular interpretation, it is believed that such a positive pressure or compaction exerted upon the slurry during its application compresses the slurry, thereby expelling interparticle air, giving rise to a composite having improved properties. In cases in which the binder employed is one that undergoes hardening while the slurry is being subjected to compaction or positive pressure, e.g., as in some forms of pumping, at least part of the hardening process taking place under compression. Once applied, further compression can be exerted onto the slurry, as it hardens in place, or the applied slurry can be allowed to harden in the absence of further compression.

The composite obtained by using application techniques such as described above can have a thermal conductivity that is no greater than about 50 mW/m·K at 23° C. and 1 atmosphere and one or more mechanical properties selected from the group consisting of (i) a flexural strength greater than about 0.05 MPa; (ii) a compressive strength greater than about 0.1 MPa; and (iii) an elastic modulus greater than about 0.5 MPa.

Further embodiments of the invention relate to methods and end use applications that employ the composites described above.

Composites described herein can be employed in building envelope insulation. For example, they can be used to insulate the exterior walls, floors, and roofs of a building (the building envelope). The composites can be made into preformed rigid panels which are applied to walls, e.g., to the interior of the walls. Wet slurries can be pumped into a cavity and allowed to harden in place. For instance, the slurry can be pumped into the space that commonly exists in a brick façade between the facing bricks and the structural wall in a typical "cavity wall" construction.

Using the composite in building envelope applications can result in greater insulating efficiency for the same thickness as traditional insulation materials such as glass wool or expanded polystyrene, or a reduced insulation thickness with the composite that provides the same thermal efficiency as a thicker layer of traditional insulation material.

Furthermore, some composites can have sufficient mechanical strength to carry structural loads, while also providing insulation performance that far exceeds traditional structural materials such as wood, steel, and concrete. These traditional materials often create the problem of "thermal bridges" in buildings which are conduits for undesirable heat loss/gain and which are mitigated by use of the composites. When used in building envelope applications, the aerogel-containing composites described herein can be machined, subjected to hole drilling, can be provided with nails, screws and so forth, while retaining their properties, e.g., thermal and acoustical insulation.

In specific implementations, the composites are used to insulate roofs and floors with either pre-formed rigid panels or a slurry that is cast in place. For example, the composite can be used as to insulating concrete in building foundations, walls, floors, and ceilings. The thermal conductivity of the composite can be significantly lower than traditional materials and, in some implementations, the composites have excellent strength under compression, and thus can be used to prevent significant heat flow that occurs through conventional concrete thermal bridges.

Modern insulated hollow bricks can have a thermal conductivity of 80 mW/m-K or less. However, conventional mortars that hold these bricks together can have a thermal conductivity of greater than 1000 mW/m-K. Such mortars, therefore, allow heat flow to readily bypass the insulated brick creating a thermal bridge that significantly reduces the overall energy efficiency of the wall.

Thermal bridging can be lowered by using mortars that employ composites such as those disclosed herein. These mortars can be applied on the surface (e.g., interior or exterior surface of a wall), between bricks, between blocks or other elements of a wall or of another structure and in other mortar applications.

In one specific example, an aerogel-containing precursor slurry that hardens into a composite, e.g., a composite having insulating and mechanical properties such as described above, is used as a mortar that covers concrete, or for floor or roof fillings in the building industry. The slurry can be applied by any suitable means to a cement base, e.g., one supporting one or more walls, to a load bearing concrete ceiling, or to other layers or structures that are typically covered or filled with insulating mortar, as described, for instance, in U.S. Pat. No. 5,904,763, with the title Insulating Mortar, issued on May 18, 1999 to Blocjen, the contents of which are incorporated herein by reference in their entirety. If tubing or piping has been laid onto the cement base, the slurry can be applied to cover it. Tiles or other flooring or ceiling materials can be laid onto the slurry. Once the slurry is applied, it can be compressed in situ, for example by stamping with a flat tool or by other means.

Because of its reduced weight, the hardened composite can reduce the thickness of the mortar layer or filling needed or can add insulating characteristics to a comparable layer or filling made from conventional materials, e.g., mixtures of cement and vermiculite; phenol resin and cement; or comminuted hard polyurethane and cement. In specific examples, the aerogel containing composite can have a thickness of 1 cm or less, 2 cm, 3 cm, 5 cm, 7 cm, 10 cm or more. Use of the composites and methods described herein can result in coverings and filling that combine good thermal, acoustical and electrical insulation, fire resistance properties, water proofing and so forth, and thus can reduce the number of layers and/or ingredients employed in conventional coverings and fillings. For example, the need for separate acoustical footfall insulation layers and/or water sealing for roof applications can be reduced or eliminated.

In some cases, the composite may be used as a subfloor beneath heating elements in a heated flooring system. Because of the thermal efficiency of the composite, the thickness of the insulating subfloor can be less than that available with other materials, therefore reducing total floor height, which is an especially important consideration in retrofit or renovation projects.

The composites also can be used as acoustic insulation, e.g., acoustic panels such as employed for acoustic ceiling tiles, in interior building applications such as ceiling tiles and floor and wall sound absorbing panels. In some circumstances, and especially when matched with complementary sound absorbing materials such as lead sheet, the composites will attenuate both the sound transmitted through the walls, floors, and ceilings, as well as the sound that is reflected off these surfaces. In some instances, composites such as those disclosed herein have good sound reflecting properties and can be used as sound blocking articles and/or materials.

The composite may also be used on ships, submarines and other marine applications, and in particular in those where space is at a premium, for deadening sound transmission.

The composites disclosed herein demonstrates excellent resistance to the spread of flame and high temperatures of a fire and can be used in fire protection, e.g., in fire barriers in buildings, transportation, e.g., ships, or in industrial, recreational or commercial facilities. The composites may be used in fire doors or fire walls to contain the flames and heat generated in a fire, or can be incorporated in fire-fighting equipment.

The composites may also be used to seal penetrations through walls, e.g., at places where pipes, cables, conduits, ducts and so forth must pass through the fire wall. In this use, the composite may be cast in place around the pipe, cable, conduit, duct, or other object in order to make an effective seal.

The composite may also be employed to provide fire protection for steel structural members such as beams and columns. The composite may either be applied to the steel as preformed panels. In other cases, the composite may be applied in a wet (slurry) state to the surface of the steel by spraying, troweling, sputtering or other means and subsequently allowed to harden.

The composite may be used to create architectural elements such as trim boards, casements, siding, moldings, window frames, and door frames and other details which have aesthetic and weatherproofing functionality while at the same time serving to insulate the building.

Certain embodiments of the composite can transmit light through a given thickness. These embodiments may be used in the interior of hollow daylighting panels made of glass, polycarbonate, fiber reinforced plastic, and other transparent or translucent materials. The composite allows the daylighting panel to pass natural light through to the interior of a building while also providing thermal and acoustic insulation to prevent the loss/gain of heat and minimize noise penetration, e.g., from outside the building to the occupants inside. A secondary benefit from the use of these composites in daylighting panel units is that the composite is self-supporting and overcomes the problem of settlement of loose granular aerogel fill often used in these units.

The composite may be made in pre-formed panels which are then brought together with other components to make the final daylighting panel unit, or the composite. In another approach, a precursor slurry may be pumped, extruded, sprayed, or otherwise placed into a cavity in the daylighting panel unit such as the cavity between two panes of glass in an insulated glass unit (IGU).

The composite may be used to fill and insulate hollow bricks and blocks made of materials such as clay, cement, or concrete. The composite can be made by applying a wet slurry and allowing it to harden in place. Because some embodiments of the composite have a lower thermal conductivity than polyurethane foam, mineral wool, perlite, and polystyrene (also used for infilling blocks), the resulting block provides enhanced thermal efficiency. Because the composite can have significant mechanical strength, especially significant compressive strength, the use of clay, cement, concrete and other materials may be reduced or minimized, lowering weight and further improving the thermal performance of the block.

In some embodiments, an aerogel-containing slurry that can form composites such the composites described herein can be used as a mortar in masonry work, e.g., to fix bricks together. In other embodiments a brick consists of, consists essentially of or comprises the composite. In further embodiments, the bricks or masonry are formed by methods described herein.

The composites can be used in the form of rigid boards to serve as an interior finished surface for buildings. Unlike conventional wallboard which is primarily made of gypsum, the composites disclosed herein provides insulation value to the wall without adding to the thickness of the wall. As such, they are particularly well suited to renovation projects in which it is desired to make a building more energy efficient without consuming valuable interior floor space with additional insulation thickness. In a specific example, the composite is utilized in a drywall board, such as employed for interior wall surfaces in building construction.

The composite can be used as an insulating plaster, applied as a paste or slurry on interior wall surfaces, or, in other applications, on the exterior of a building. Once the wet slurry hardens (cures), it may be painted on or subjected to further finishing. The installed composite adds to the insulation value of the wall without the need for an additional thickness of insulation and without the need to modify the aesthetics of the wall to accommodate conventional insulation panels.

The composite disclosed herein may be used to insulate piping systems to provide thermal insulation with extremely high thermal efficiency. This high efficiency can allow the use of thinner insulation than traditional materials for the same thermal performance, or it can allow for greater thermal performance at the same thickness as traditional materials. Because in many implementations the composites are rigid, they can also perform a structural function to provide mechanical support or positioning without creating a "thermal bridge" for significant heat flow as with traditional structural materials such as steel, concrete, wood, glass, ceramic, mineral wool, and foam. In some implementations, composites such as described herein can be utilized in pipe insulation systems and using techniques such as described, for example, in U.S. Patent Application Publication No. 2006/0272727 A1, published on Dec. 7, 2006, with the title Insulated Pipe and Method for Preparing Same, to Dinon et al. and/or International Publication No. WO 2009/134992 A2, published on Nov. 5, 2009 with the title Manufacturing and Installation of Insulated Pipes or Elements Thereof, the contents of both being incorporated herein by reference in their entirety.

These piping systems may be subsea pipelines or overland pipelines. They may also be present in industrial process plants and include fittings such as elbows, and reducers. The composites also can be used in pipe-in-pipe applications.

There are various techniques by which the composite can be applied to a piping system. For example, the composite can be molded into rigid, pre-fabricated semi-cylindrical shells (half-shells) which are then applied to the pipe in pairs and fastened in place with tape, banding, wire, adhesive, or other means. The benefit of these pre-fabricated forms is that in certain projects, e.g., long, straight runs of pipe, they can significantly reduce installation time. Some of the shapes that can be employed are described, for example, in U.S. Patent Application Publication No. 2006/0272727 A1, published on Dec. 7, 2006, with the title Insulated Pipe and Method for Preparing Same, to Dinon et al. and/or International Publication No. WO 2009/134992 A2, published on Nov. 5, 2009 with the title Manufacturing and Installation of Insulated Pipes or Elements Thereof.

Another method of application to a pipe is to spray, sputter, extrude, or pump a precursor slurry onto the pipe surface and allow it to harden in situ. The surface may be either the inner or the outer surface of the pipe, or both. The advantages of these application methods is that the wet composite will conform to irregular surfaces, and it may be easily modified in the field to control the final dimensions of the installed insulation. In some applications, one or more of these methods can significantly reduce installation time versus alternative approaches.

A slurry precursor also can be applied by hand with a trowel or similar implement onto the piping system surface and allowed to harden in situ, without requiring any specialized equipment in the application of the slurry.

The composite can be formed for the annular space in a pipe-in-pipe system. For example, a precursor mixture in slurry form is injected into the annular space between the pipes and allowed to harden in place. In other embodiments, rigid and self supporting composites can be shaped into articles, e.g., semi-cylindrical or arched (forms described, for instance, in U.S. Patent Application Publication No. 2006/0272727 A1, published on Dec. 7, 2006, with the title Insulated Pipe and Method for Preparing Same, to Dinon et al. and/or International Publication No. WO 2009/134992 A2, published on Nov. 5, 2009 with the title Manufacturing and Installation of Insulated Pipes or Elements Thereof) that fit in the annular space and can be joined together to surround the inner pipe and head to head along a pipe length. In these pipe-in-pipe applications, the composite can perform a thermal as well as a mechanical function (to insulate and support the inner pipe), replacing less thermally efficient insulation such as polyurethane foam and mechanical centralizers for mechanical stability.

Because of aerogel's ability to absorb energy, the composite may be used as an energy absorbing material to provide blast and/or ballistic protection.

Because of the composite's excellent thermal and acoustic insulating properties, it may be used to reduce the infrared and acoustic signature of military vehicles such as helicopters, aircraft, tanks, trucks, ships, submarines, and other vehicles.

In many embodiments the composites described herein do not contain electrically conductive components, and silica aerogel is inherently an excellent electrical insulator. Composites such as disclosed herein, therefore, can be used to isolate electrically charged conductors to prevent undesired pathways for the flow of electricity.

Composites such as described herein exhibit attractive insulating properties at low temperatures and may be used to insulate ships carrying liquid natural gas (LNG), liquid petroleum gas (LPG), liquid ethylene gas (LEG), or any other refrigerated gas. They can also be used in cryogenic applications, e.g., in insulating Dewar vessels, cryogenic trailers or railroad cars.

In one embodiment the composite is placed between the hull and cargo tanks where the cargo tanks are structurally self-supporting. In these implementations, the composite acts as a highly effective thermal insulation.

In another embodiment, the composite is placed between the hull and cargo tanks where the cargo tanks are not structurally self-supporting and the mechanical loads of the cargo and tank are passed through the insulation and supported by the hull itself. In this embodiment, the composite acts as both thermal insulation and a structural element.

In both cases, the thermal efficiency of the insulating composite allows the ship designer to increase the size and cargo carrying capacity of the tanks without increasing the size of the hull. In some implementations, the composite is used in the same thickness as traditional insulation materials such as perlite or polyurethane foams, but reduce the boil-off rate of the cargo.

The composites can be used in appliances in the form of rigid panels or injected and cast-in-place in cavities. The composites can be utilized to provide thermal insulation, acoustic insulation, and compressive strength that enables designs with greater energy efficiency or expanded interior space for the same exterior footprint. This is of special value in dishwashers and refrigerators.

The following examples are illustrative and are not intended to be limiting.

EXAMPLE 1

To prepare samples, water was added to a ½ gallon plastic container of a slightly larger diameter as the mixing blade, followed by the binder (Fugenweiβ grout formulation, manufactured by SAKRET Trockenbaustoffe Europa GmbH & Co. KG, Otto-von-Guericke-Ring 3, D-65205 Wiesbaden, Germany) and Nanogel aerogel TLD302. No other ingredients were employed. The composition was mixed for approximately 3 minutes then poured into a rectangular mold of volume. Amounts employed are shown in Tables IA and IB below.

A wooden mold (8"×8" cavity size) was used to compress samples to "15%". Here 115% of material by weight (1.15 fill factor), compared to a baseline, was added to the mold and the sample compress to 0.75" thickness with use of C-clamps and the top plate. This resulted in material being squeezed, with some water being discharged from the mold. This sample was left under compression for 24 hours (hr) and then was removed from the wooden mold. The sample was further air dried for 24 hr before removing from the mold. Compared to a sample of the same composition but cured in the absence of compression, the sample handleability was considerably improved. For instance, the sample did not break or snap as easily as control samples (hardened in the absence of compression) when held at a corner and waved in air. It is believed that this improvement is, at least in part, a manifestation of the enhanced flexural strength seen with the experimental samples.

A metal mold was used for 1.3 and higher fill factors. In this case, 1.3 to 1.5 times the typical amount was added to the metal mold and the material was compressed to 0.75" thickness in a Carver style hydraulic press (Model Phi by Pasadena Presses, Pasadena Calif.) at approximately 6000 lbs. The sample was left under compression for 24 hr, after which the compression was released and the sample was air dried for 24 hr before removing from the mold.

The thermal conductivity was measured on a Lasercomp Model Fox 200. The mean temperature of the measurement was 23° C. and the bottom and top plates were kept at 36° C. and 10° C. respectively. For Mean temperature of 12.5 the bottom and top plates were kept at 25° C. and 0° C. respectively and 62.5° C., the bottom and top plates were kept at 75° C. and 50° C. respectively.

Compressive strength testing was performed using an Instron Model 4204 with a 35 mm diameter circular shaft onto a flat stand. The sample was cut from an 8"×8" sample to a size of 4"×4". The sample was placed down onto the stand, and the shaft was allowed to press down onto the top side of the sample. The shaft (area=9.57 cm$^2$) pushed down on the sample at 15 mm/minute until the maximum load was reached at 475N. At that point the shaft was lifted at 25 mm/minute to the original height. The Merlin Materials Testing Software was used to record the height and pressure (in Newtons) during the test. Compression stress (MPa) vs. the strain was selected to graph the data. The strain was the percent of the total height of the sample that was depressed by the shaft.

Other experiments were conducted with a 50 kN load cell.

Flexural strength was measured by a 4 point bend test. The test was done on an Instron model 4204 with a 4 point bend test setup. Samples were cut to be approximately 1" wide× 0.75" deep×4" long. The actual width and depth was measured and recorded for calculations. The head was set up just above the level of the sample by eye inspection and the test was started. The head was brought down at 15 mm/min to an extension of 10 mm, with a max load of 500N. The head retracted at a higher rate of speed. The test was only valid if the break point occurred between the two inside points.

Tables IA and IB show data from samples made with different binder amounts (in grams) and different compression levels. A significant improvement in thermal performance, believed to be caused by removal of air with compression was observed in Samples 1a and 1b. No breakage is seen for these samples and their compressive strength was >0.5 MPa, the limit of the testing set-up. In contrast, Samples 1c and 1d, were prepared using the same ingredients and amounts but in the absence of compression. The thermal conductivity of the comparative samples, and in particular in the case of sample 1c, was higher than that of samples 1a and 1b.

TABLE IA

| Sample # | DI water (g) | Binder (g) | TLD302 (g) | Density of dry sample (g/cm$^3$) | Overfill |
|---|---|---|---|---|---|
| 1a | 201.0 | 20.4 | 100.3 | 0.184 | 1.3 |
| 1b | 201.7 | 20.1 | 100.1 | 0.195 | 1.5 |
| 1c | 290.4 | 200.0 | 100.2 | 0.295 | 1 |
| 1d | 215.0 | 100.4 | 50.1 | 0.192 | 1 |

TABLE IB

| Sample # | Compressive Strength (MPa) | Flexural Strength (MPa) | Conductivity at 12.5 C. (mW/m-K) | Conductivity at 23 C. (mW/m-K) | Conductivity at 62.5 C. (mW/m-K) |
|---|---|---|---|---|---|
| 1a | >0.5 Mpa | 0.0876 | 15.40 | 15.67 | 17.34 |
| 1b | >0.5 Mpa | 0.0998 | 15.94 | 16.30 | 18.04 |
| 1c | | | | 28.93 | |
| 1d | | | | 19.53 | |

EXAMPLE 2

As shown in Table IIA, samples without glass fibers were made in accordance to example 1, above. In case of samples with fibers, typically 200 g of DI Water, 100 g Nanogel aerogel TLD302 and 20 g Binder (Fugenwiess grout formulation described above, unless noted otherwise) were added to a 2 L mixing vessel. A drill with a helical attachment was used to mix for 3 minutes total, 1 minute on Low (1000 rpm) and 2 minutes on High (3000 rpm). Once mixed, the resulting paste-like mixture was transferred to a gallon plastic container and 10-50 g Belcotex™ 6 mm glass fibers (obtained from Lauscha Fiber International Corp., Summerville, S.C., was added along with 50 g DI Water. This mixture was mixed with the drill and helical attachment for 1 minute on Low (1000 rpm).

Sample #14 was prepared using Adhesive grout obtained from Custom Building Products, CA, USA as a binder instead of the Fugenweiss grout formulation.

Samples with compression were made following protocols similar to those in Example 1.

Samples with high compression had improved mechanical strength, both compressive and flexural. For most of the samples in Table II, the ultimate compressive strength was not reached, therefore compressive strain values at maximum compressive stress are noted.

The thermal conductivity was measured on a Lasercomp Model Fox 200. The mean temperature of the measurement was 23° C. and the bottom and top plates were kept at 36° C. and 10° C. respectively. For Mean temperature of 12.5 the bottom and top plates were kept at 25° C. and 0° C. respectively and 62.5° C., the bottom and top plates were kept at 75° C. and 50° C. respectively.

Compression testing was done on an Instron Model 4204 with a 35 mm diameter circular shaft onto a flat stand. The sample was cut from an 8"×8" sample to a size of 4"×4". The sample was placed down onto the stand, and the shaft allowed to press down onto the top side of the sample. The shaft (area 9.57 cm$^2$) pushed down on the sample at 15 mm/minute until the max stress was reached at 475N. At that point the shaft is lifted back up at 25 mm/minute to the original height. The Merlin Materials Testing Software was used to record the height and pressure (in Newtons) during the test. Compression stress (MPa) vs. strain was selected to graph the data, and the strain was the percent of the total height of the sample that was depressed by the shaft. Other experiments were conducted with a 50 kN load cell.

Flexural Strength was measured by a 4 point bend test. The 4 point bend test was done on an Instron model 4204 with a 4 point bend test setup. Samples were cut to be approximately 1" wide×0.75" deep×4" long. The actual width and depth was measured and recorded for calculations. The head was set up just above the level of the sample by eye and the test was started. The head was brought down at 15 mm/min to an extension of 10 mm, with a max load of 500N. The head retracted at a higher rate of speed. The test was only valid if the break point occurred between the two inside points.

The tables above shows the results of various binder concentration, fiber concentration and compression effects. The results indicate that, unlike typical insulation materials an increase in density of the composite samples does not increase the thermal conductivity of the material; in fact a slight reduction is observed. At the same time a substantial improvement in mechanical strength if observed. This is a non-typical result and allows the compression to be used advantageously to create strong samples. Comparing sample 2a to 2c one notes that 2a fails in compression at 0.3 MPa, whereas 2c has compressive strength >0.5 MPa. In addition, sample 2c shows twice the flexural strength of 2a. The thermal performance is not impacted (16.4 mW/m-K v/s 16.3 mW/mK).

Furthermore, increasing the compression, such as in Run 15 shows a slight increase in thermal conductivity (18.6 mW/m·K) and a corresponding increase in strength and elastic modulus. When a 50 kN load cell was utilized, a high density composite (e.g., sample 2h, Table IIA) had a maximum load of 2460N (average of two trials) which translates to a compressive strength of 2.57 MPa.

When the addition of glass fibers to the composite mix is such that the fiber length is preserved at the mm length scale and a narrow distribution is maintained, the samples showed a dramatic improvement in mechanical properties. For

TABLE IIA

| Sample # | Run # | DI water (g) | Binder (g) | Belcotex 6 mm (g) | TLD302 (g) | Addnl. Water (g) | Compress. | Overfill |
|---|---|---|---|---|---|---|---|---|
| 2a | 1 | 200.0 | 20.0 | | 100.0 | | 0% | 1 |
| 2b | 2 | 200.0 | 20.0 | 33.0 | 100.0 | 50.0 | 0% | 1 |
| 2c | 3 | 260.0 | 26.0 | | 130.0 | | 30% | 1.3 |
| 2d | 4A | 325.0 | 26.0 | 42.9 | 130.0 | 0.0 | 30% | 1.3 |
| 2e | 4B | 260.0 | 26.0 | 42.9 | 130.0 | 65.0 | 30% | 1.3 |
| 2f | 5 | 230.0 | 57.5 | 17.3 | 115.0 | 57.5 | 15% | 1.15 |
| 2g | 6 | 230.0 | 57.5 | 17.3 | 115.0 | 57.5 | 15% | 1.15 |
| 2h | 8 | 280.0 | 70.0 | 21.0 | 140.0 | 70.0 | 40% | 1.4 |
| 2i | 9 | 200.0 | 80.0 | | 100.0 | | 0% | 1 |
| 2j | 10 | 200.0 | 80.0 | 30.0 | 100.0 | 50.0 | 0% | 1 |
| 2k | 11 | 260.0 | 104.0 | | 130.0 | | 30% | 1.3 |
| 2l | 12 | 260.0 | 104.0 | 39.0 | 130.0 | 65.0 | 30% | 1.3 |
| 2m | 13 | 230.0 | 115.0 | 17.3 | 115.0 | 57.5 | 15% | 1.15 |
| 2n | 14 | 200.0 | 20.0 | | 130.0 | | 30% | 1.3 |
| 2o | 15 | 200.0 | 20 | | 100.0 | | 50% | 1.5 |

TABLE IIB

| Sample # | Run # | Density of dry sample (g/cc) | % Compressive Strain at 0.5 MPa | Compressive Stress at 10% Strain (MPa) | Flexural Strength (MPa) | Thermal Conductivity at 23 C. (mW/mK) |
|---|---|---|---|---|---|---|
| 2a | 1 | 0.152 | | | 0.05 | 16.4 |
| 2b | 2 | 0.162 | 42 | | 0.04 | 19.5 |
| 2c | 3 | 0.195 | 18.9 | | 0.10 | 16.3 |
| 2d | 4A | 0.210 | 16.9 | | 0.14 | 22.5 |
| 2e | 4B | 0.226 | 18.5 | 0.19 | 0.22 | 20.0 |
| 2f | 5 | 0.318 | 8.4 | >0.5 | 0.23 | 66.4 |
| 2g | 6 | 0.245 | 16.15 | 0.25 | 0.10 | 40.8 |
| 2h | 8 | 0.307 | 9.61 | 0.445 | 0.30 | 31.7 |
| 2i | 9 | 0.258 | | 0.23 | | 23.9 |
| 2j | 10 | 0.299 | 26 | 0.19 | 0.17 | 52.0 |
| 2k | 11 | 0.361 | 8.8 | >0.5 | 0.17 | 47.3 |
| 2l | 12 | 0.341 | 15.6 | 0.13 | 0.45 | 45.7 |
| 2m | 13 | 0.468 | 8.4 | >0.5 | 0.46 | 95.7 |
| 2n | 14 | | | | | 15.7 |
| 2o | 15 | 0.23 | 15.2 | | | 18.6 |

1 In compression, fails at 0.3 MPa
9 In compression, fails at 0.3 MPa and 18% Strain instance, sample 2b shows more than a 5 times improvement in compressive strength, with a just a slight increase in thermal conductivity.

Surprisingly, the combination of the dispersed, long and narrow fiber distribution along with compression during curing results in a synergistic rather than an additive effect, resulting in samples that are significantly improved, as demonstrated in example 2e.

Several samples (one having low density, two medium density, and one high density) were impact tested on an Instron Dynatup 8250 drop weight impact test machine. The procedure was similar to that used to prepare samples 2a-2o and details are provided in Table IIC below. Sample properties are shown in Table IID below.

TABLE IIC

| Density of Composite | DI Water (g) | Binder (g) | TLD302 (g) | Glass Fibers (g) | Overfill |
|---|---|---|---|---|---|
| Low | 200 | 20 | 100 | 0 | 1.3 |
| Medium | 250 | 20 | 100 | 15 | 1.3 |
| High | 275 | 50 | 100 | 15 | 1.4 |

TABLE IID

| Density of Composite | Thermal Conductivity ( ) (mW/m-K) | Density (ρ) (g/cc) | Flexure Strength (MPa) | Compressive Strength (MPa) |
|---|---|---|---|---|
| Low | 17.4 | 0.18 | 0.069 | 0.5 |
| Medium | 20.9 | 0.21 | — | — |
| High | 25.7 | 0.26 | 0.08 | 2.4 |

When impact tested, the low density samples did not provide enough resistance to register meaningful data. The medium and high density samples results are shown in Table IIE below.

TABLE IIE

| | max load | |
|---|---|---|
| Sample Type | Average | Std. Dev. |
| Medium Density | 0.103 kn | 0.010 |
| High Density | 0.190 kn | 0.028 |

EXAMPLE 3

Figure 1A:
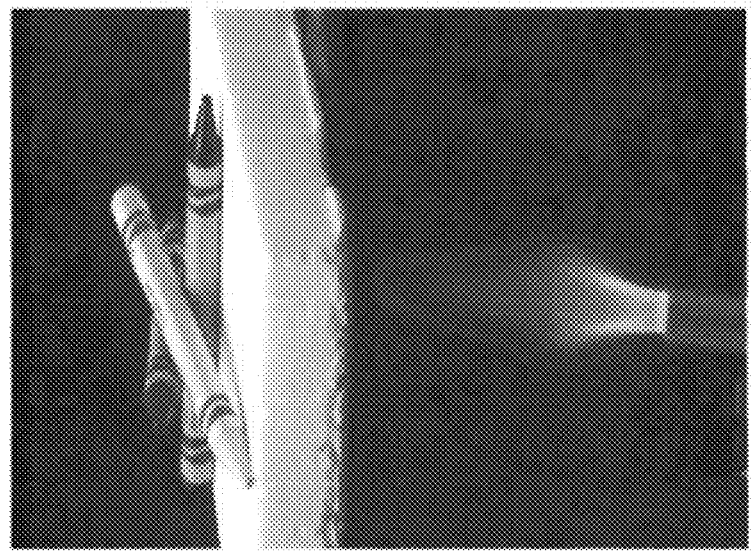
Figure 1C:
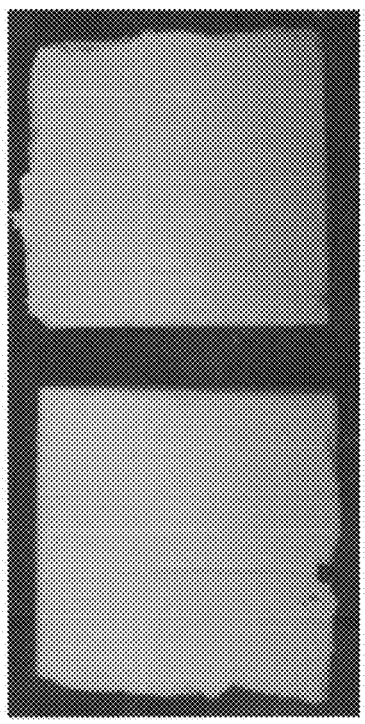
FIG. 1C is a photograph of the top side of the composites of FIGS. 1A and 1B after removal of the flame.

Samples such as samples 2a and 2b above were subjected to flame tests. In one example, composites were prepared by cutting a small section from the samples prepared by 2a above and subjected to a flame test, visually illustrated in FIGS. 1A and 1B. Specifically, a slab having the dimensions of 4" by 4" was employed to support crayons or a flower. The bottom of the slab was heated by an open flame produced by a Bunsen burner. The crayons and flower remain were intact after heating for (i) 3 minutes or (ii) 5-10 minutes. The crayons did not melt nor was the flower damaged during the test period. This demonstrated not only the insulating performance of the self supporting composite, but was also an indication of its performance under flame and its ability to withstand a flame and associated high temperatures for long durations. (In contrast, a polymer foam such a polyurethane foam with similar thermal properties would burn under the propane flame). Furthermore, inspection of the slab itself after the flame was removed showed no damage at the top side of the 20 mm thick composite as illustrated in FIG. 1C.

Figure 1D:
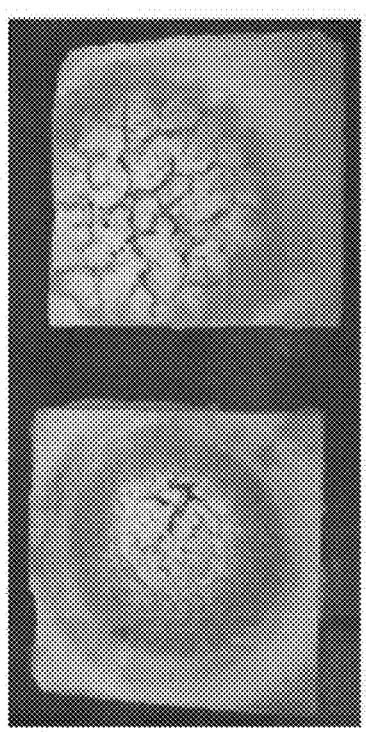
FIG. 1D is a photograph of bottom of the composites of FIGS. 1A and 1B after removal of the flame.

The bottom of the sample (composite face in direct contact with the flame) showed consolidation of the silica matrix in the near region of the flame as illustrated in FIG. 1D. However, the sample as a whole maintained its integrity

EXAMPLE 4

Samples were prepared as described above with respect to sample 2h and were subjected to machining and other operations designed to test the suitability of samples made according to the invention for end-use applications such as those described above.

It was found that such samples could be cut, e.g., to a 4×4 inch square from an 8×8 inch square using a hacksaw. Although the operation produced a fair amount of dust which was controlled by shop vacuum(s), dust masks and goggles, samples could be edged using a table saw with a plywood blade.

Samples could be routed on a routing table and kept its edge well. A sample with routed surface and edges is shown in FIG. 2A. A certain amount of stickiness or friction was observed in conducting the sliding across the table.

Figure 2B:
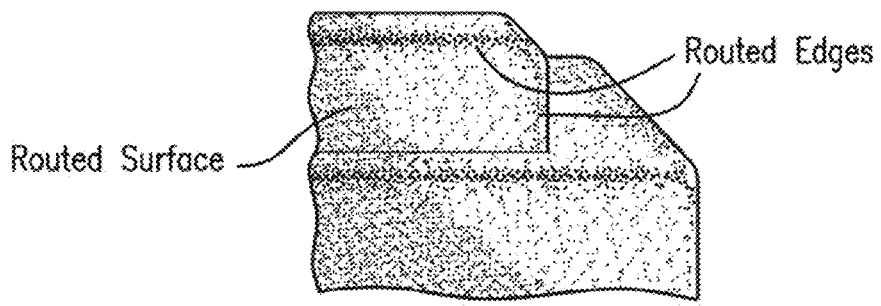
FIG. 2B is a photograph of a composite sample according to the invention, with a drywall anchor screwed into it.
Figure 2B:
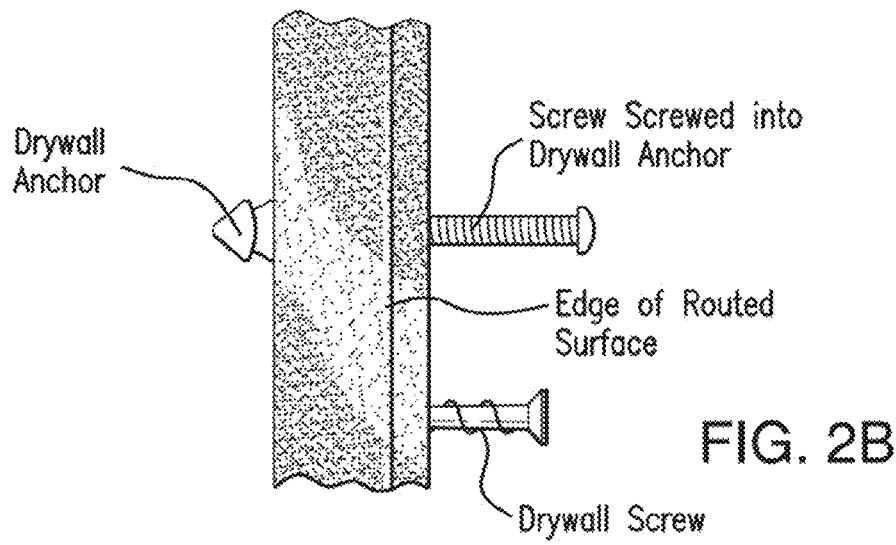
Figure 2C:
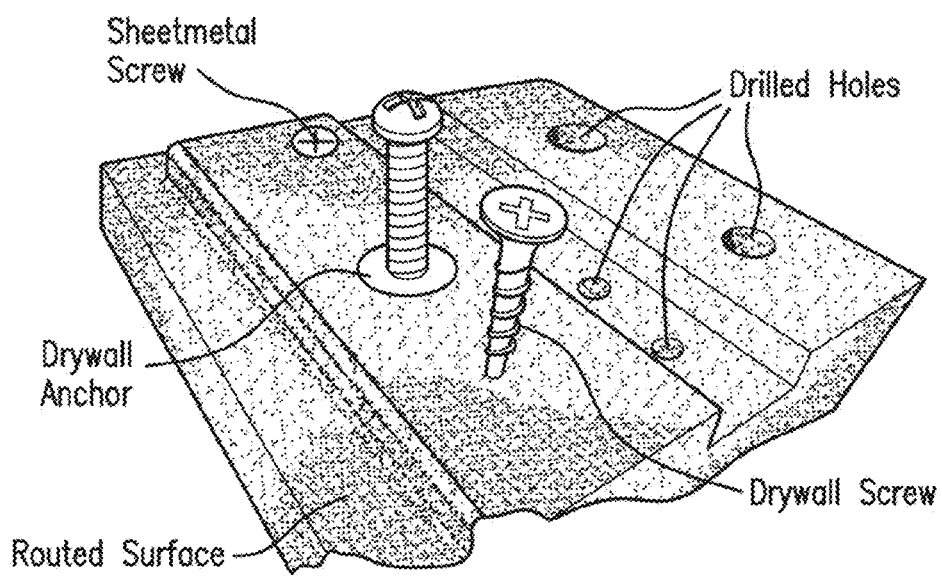
FIG. 2C is a photograph of a composite sample according to the invention illustrating several drilled holes and screwed in sheet metal screws and drywall screws.

It was possible to drill clean holes in the samples using a handheld cordless drill and a drill press. A drywall anchor was screwed in and held well. Specifically, once a screw was inserted into the anchor, the screw/anchor could not be easily separated by hand. The screw-anchor assembly was found to be suitable in supporting a reasonable weight. Both drywall screws and a sheet metal screws were tested and both held well and could not be easily pulled out when added to the sample. Results are visually illustrated in FIGS. 2B and 2C, showing a sample having a routed edge and affixed to a drywall anchor by one or more screws (drywall as well as metal). Holes drilled in the sample also can be seen (FIG. 2C).

Figure 2D:
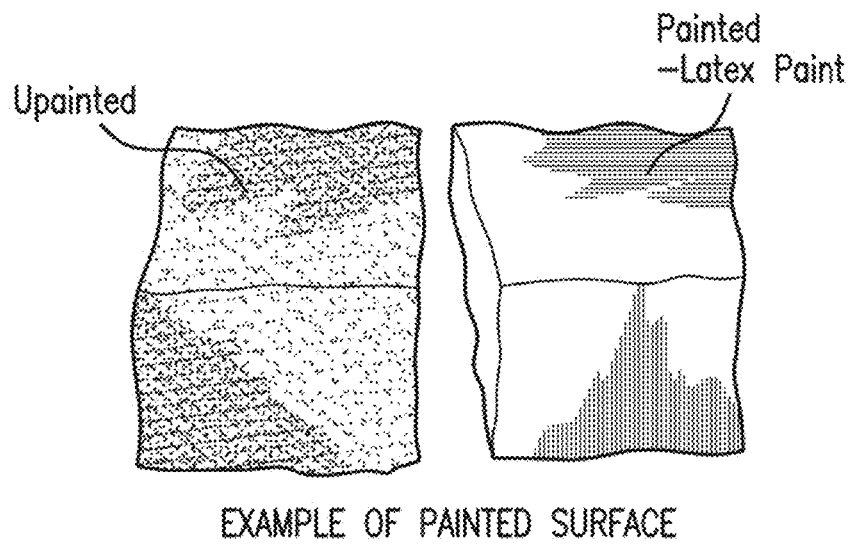
FIG. 2D is a photograph of a latex painted composite sample according to the invention next to an unpainted composite sample, also according to the invention.
Figure 2E:
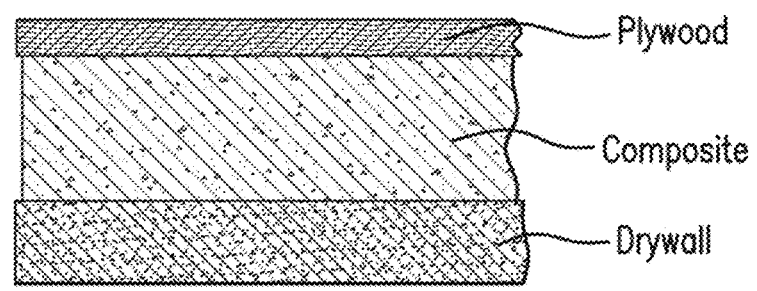
FIG. 2E is a photograph of a layered arrangement in which a composite sample according to the invention is glued (laminated) between plywood and drywall layers.

The sample was easily painted with latex paint. A latex painted sample and an unpainted sample are shown in FIG. 2D. Urethane treatment held well but was found to discolor the sample. Spray-on shellac was found to form a crumbly material on the sample, presumably by some chemical reaction, but the crumbly material could be brushed off.

The samples could be glued to drywall and plywood using a conventional adhesive such as Elmer's glue. A sandwich-type assembly in which a sample was glued between a drywall layer and a plywood layer (as shown in FIG. E) was found to hold together well.

EXAMPLE 5

Samples were prepared using the following polymer and cellulose based fibers: CPINE™ fibers (cellulosic fibers from Weyerhaueser Co., Nashua, N.H.); Createch™ TC750 (cellulosic fibers from CreaFill Fibers Corp., Chestertown, Md.); and Trevira™ 255 (polymeric fibers from Trevira GmbH, Bobingen Germany). Since the CPINE™ were provided in sheets, the sheets were soaked in water and then placed in a shaker to separate the fibers before use.

Typically these samples were made using 220 g of DI Water, 110 g Nanogel® aerogel TLD302 and 22 g binder. Unless otherwise noted, the binder was provided in Fugenwiess grout formulation (described above). The components were added to a 2 liter (1) mixing vessel. A drill with a helical attachment was used to mix for 3 minutes total, 1 minute on Low (1000 rpm) and 2 minutes on High (3000 rpm). Once mixed, the resulting paste-like mixture was transferred to a gallon plastic container and 10-50 g non-mineral wool fibers were added along with 70-150 g DI Water. This mixture was mixed with the drill and helical attachment for 1 minute on Low (1000 rpm).

A metal mold such as described above was filled using 1.3 to 1.5 times the typical amount of the mixture and the material was compressed to 0.75" thickness in a Carver style hydraulic press (Model Phi by Pasadena Presses, Pasadena Calif.) at approximately 6000 lbs. The sample was left under compression for 24 hr, after which the compression was released and the sample was air dried for 24 hr before being removed from the mold.

Properties of the samples are shown in Table III.

TABLE III

| Sample | DI water (g) | Binder (g) | TLD302 (g) | Density of dry sample (g/cc) | Overfill | Thermal Conductivity (mW/m · K) | Fiber |
|---|---|---|---|---|---|---|---|
| 3a | 219.8 | 21.9 | 110.5 | 0.144 | 1.4 | 24.37 | CPINE |
| 3b | 220.2 | 21.8 | 110.1 | 0.148 | 1.4 | 30.38 | Createch T C750 |
| 3c | 222.0 | 22.2 | 109.9 | 0.175 | 1.4 | 22.05 | Trevira 255 |

The samples above could be handled and waved around without cracking. This qualitative test indicates that these samples have significant strength and are improved over Sample 2a (without fibers and compression).

EXAMPLE 6

Figure 3:
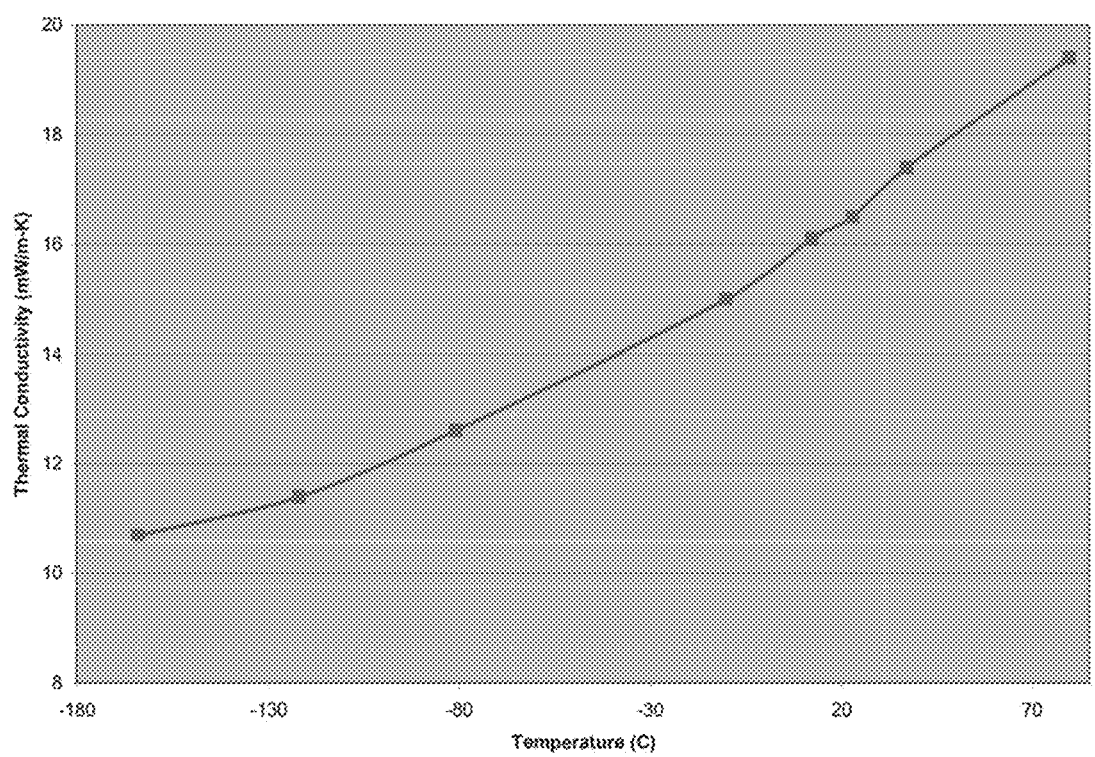
FIG. 3 is a plot of the thermal conductivity as a function of temperature for one composite according to the invention.

Experiments were conducted to investigate performance of the composites for low temperature applications. Samples were prepared by a high shear process in which water, in an amount of 200 g and Fugenweiss grout formulation (binder), in an amount of 20 g were combined in a plastic container. An amount of 100 g of Nanogel® type aerogel (designation TLD302) was added and mixed in with a 5-gallon pail paint stirring blade on the end of a power drill. This mixture was poured into an aluminum mold, compressed overnight and dried. Thermal conductivity testing was performed according to the ASTM C 177 standard. The lowest temperature at which thermal conductivity was measured was −164° C. The results are presented in FIG. 3 and indicate that aerogel composites such as those described herein can find applications in low temperature or cryogenic environments, e.g., in providing insulation suitable for LNG pumping or transport.

EXAMPLE 7

Experiments were also conducted to investigate the acoustical properties of aerogel composites. Samples (low and high density) were prepared by the standard method as detailed in Example 2. 164.

Figure 4:
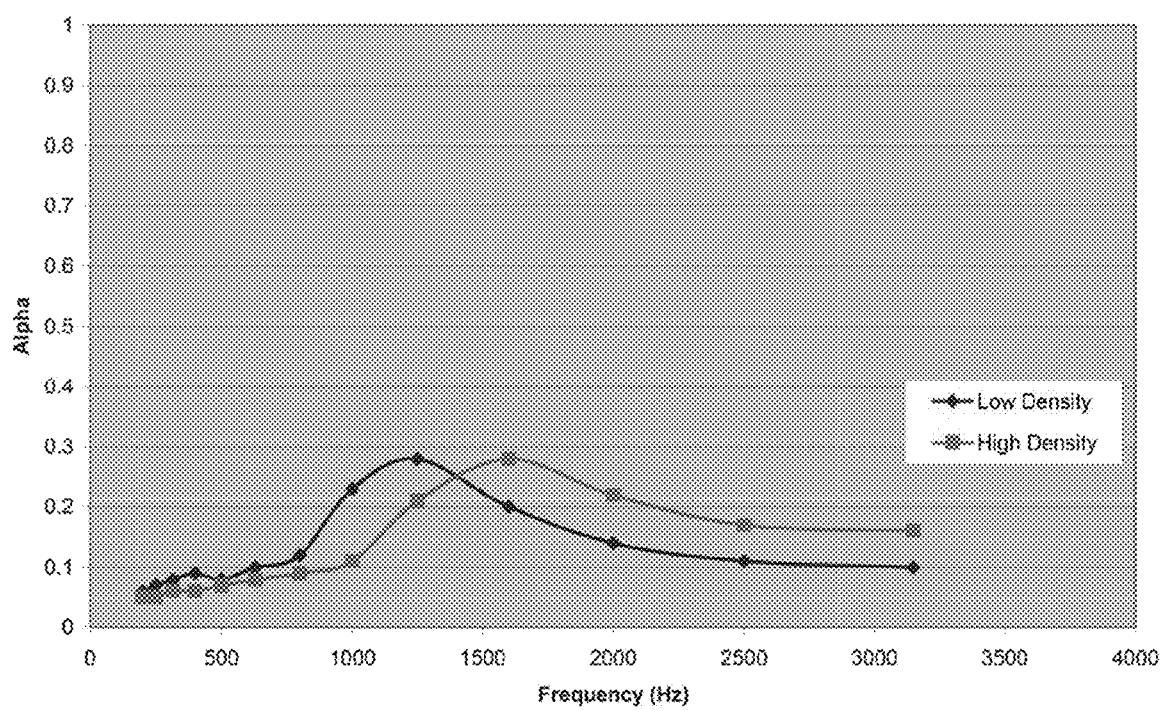
FIG. 4 is a series of plots of the absorption coefficient versus frequency for composites according to the invention.

The tests were conducted according to ASTM E 1050-08 by Architectural Testing Inc., York, Pa. The results (absorption coefficient as a function of frequency) are shown in Table IV and FIG. 4.

TABLE IV

| | Frequency | | | | |
|---|---|---|---|---|---|
| | 250 Hz | 500 Hz | 1000 Hz | 2000 Hz | NRC |
| Low Density | 0.07 | 0.08 | 0.23 | 0.14 | 0.15 |
| High Density | 0.05 | 0.07 | 0.11 | 0.22 | 0.10 |

The noise reduction class (NRC) was 0.10 to 0.015. This is in comparison to a loose 8 mm thick bed of aerogel with a NRC of 0.60.

Surprisingly, the composites did not appear to exhibit the expected sound absorbing and transmitting properties of a solid block of aerogel or even a bed of aerogel particles. Rather the samples were found to have good sound reflecting properties. A low density composite with low thermal conductivity and good sound reflecting properties can have interesting applications, such as in exterior insulation.

EXAMPLE 8

Several experiments also were carried out to study the effects of shear and/or mixing equipment on properties of the composites. Details regarding ingredients utilized and properties of the composites formed are presented in Tables VA and Vb. In all cases, the binder was Fugenweiss grout formulation.

In some tests, a low shear mixing via a rolling approach was used. The mixing vessel was a standard 2 gallon pail with two modifications: (i) another top was bolted onto the bottom on the pail to make two equal surfaces to roll on; (ii) a small piece of L shaped (3"×1.5") aluminum angle was attached to the inside to facilitate mixing. The angle protruded about an inch towards the center of the pail.

Samples were prepared using 100 g TLD302 Nanogel® aerogel (the same type aerogel employed in making composites using high shear mixing), 40 g Fugenweiss grout formulation and 300 g DI water. Experiments were run twice, with two buckets each, using the same ingredients.

In the first approach, 130% by weight of the ingredients were added to the pail without premixing and rolled for 1 hour. The ingredients did not mix properly; rather, the material became wetted, but then stuck to the outside of the bucket and did not fall off the sides to be mixed in. The two batches (fill factor=1.0 and 1.3) were put into molds and dried overnight. The 130% (fill factor=1.3) batch was cured under compression in the press. One sample was cured overnight with no compression but did not set into a self-supporting rigid composite. Rather, it remained a non-cohesive bed of particles.

The sample cured under compression exhibited a different behavior. As soon as the pressure was removed, the top of the mold sprung back up about 8 mm. It is believed that, in the absence of high shear, the particle size distribution and hence the packing of particles was inadequate. Once compression was removed, the binder was unable to counteract the elastic tendency of the aerogel particles to decompress (spring back).

The rolling tests also suggested that particle size could play a role when producing the composites. With rolling type mixing, for instance, the TLD302 particles (particle size of 1.2-4.0 mm) were not sheared down to a reduced particle size. In contrast, high shear mixing decreased the particle size of the TDL302 type aerogel.

In another set of tests, low shear was provided by a Kitchenaid™ mixer with a standard blade attachment identified by the manufacturer as the "flat beater". The Nanogel® type aerogel used was TLD101 grade (particle size of 0.1-0.7 mm). This type of aerogel was thought to approximate the (sheared down or reduced) particle size of the TLD302 type aerogel, obtained after high shear mixing. A control experiment (sample 5f), exchanging TLD302 grade aerogel with TLD101 grade aerogel using high shear mixing also was conducted.

In the first trial (sample 5e), the dry ingredients were introduced to the mixing vessel and water was added drop by drop. This did not promote mixing. It was thought that, as each water droplet was added to the dry mixture, the drop was coated with aerogel (the dry water effect) and did not have an opportunity to wet the aerogel and grout to form a slurry. At the end of the experiment, water (about 5 grams) was found at the bottom of the mixing vessel. It was clear that this water did not get mixed in during the process.

The second trial was conducted in a different way. The water, binder and 1 g of a 50% solution (with water) of Pluronic P84 surfactant was added to the mixing vessel beforehand and mixed. The aerogel was added to the mixer in ¼ amounts and allowed to stir in before any more was added. A slurry was formed, but it was dry in comparison to slurries produced by standard (high shear) techniques. Water was added in 20 g amounts at the end to lower the viscosity and insure good mixing. This resulted in a suitable slurry. The slurry was formed in a mold and the mold was placed in the press overnight to cure. Due to a power failure, the press shut down and lost pressure over the night. Although a composite (sample 5 g) that could be easily handled was formed, it was thought that its strength suffered. When the experiment was repeated (without the power failure) the composite (sample 5h) was comparable to a standard low density composite (see Tables IIC and IID) and mechanical properties comparable to the sample produced using high shear mixing.

EXAMPLE 9

Larger scale experiments also were conducted. The first trial was 5× the standard low density composite recipe (See Tables IIC and IID above) in a plastic 5 gallon pail (10 inches across at the bottom and 11 inches at the top). The volume of the mixture was not high enough to ensure good mixing, so the volume was increased to 7.5×. The first mixing blade used (4 inches) was the same mixing blade that had been used with the smaller batches. This blade was not adequate (probably not large enough) to mix the entire composition at the same time. In addition, it did not appear to provide sufficient shearing down of the aerogel particles, a behavior thought to negatively impact the packing efficiency of the particles.

A second trial was carried out using a different blade, namely a Grip type 8.5 inch mud mixer (or mud mixing blade) available from Home Depot, Waltham, Mass. The tip speed of the blade was just under 1900 fpm and was considered reasonably close to the tip speed of the standard (high shear) blade (890 fpm) used in laboratory scale experiments.

Although the larger blade at this speed may turn out to be entirely suitable in reducing the size of larger type aerogel particles (e.g., TLD302 grade aerogel), the need for shearing down the aerogel particles was eliminated by replacing the TLD302 grade (particle size of 1.2 mm-4.0 mm) with TLD101 grade aerogel (particle size 0.1-0.7 mm). The batch was scaled up to ~8.5× the standard size, and 10 g of 50% Pluronic P84 surfactant was used to help the smaller particle size of the TLD101 become incorporated into the slurry. The

TABLE VA

| Sample ID # | DI H2O (g) | Binder (g) | Aerogel (g) | Aerogel type | 50% P84 Surfactant (g) | Mixing Condition |
|---|---|---|---|---|---|---|
| 5a | 300 | 40 | 100 | TLD302 | 0 | roller |
| 5b | 390 | 52 | 130 | TLD302 | 0 | roller |
| 5c | 300 | 40 | 100 | TLD101 | 0 | roller |
| 5d | 390 | 52 | 130 | TLD101 | 0 | roller |
| 5e | 260 | 26 | 130 | TLD101 | 0 | Kitchenaid ™ |
| 5f | 210 | 20 | 100 | TLD101 | 1 | Drill (high shear) |
| 5g | 320 | 26 | 130 | TLD101 | 1 | Kitchenaid ™ |
| 5h | 320 | 26 | 130 | TLD101 | 1 | Kitchenaid ™ |

TABLE VB

| Sample ID # | Thermal Data (12.5 C.) (mW/m-K) | Compressive Strength | Flexure Strength |
|---|---|---|---|
| 5a | — | — | — |
| 5b | — | — | — |
| 5c | — | — | — |
| 5d | — | — | — |
| 5e | — | — | — |
| 5f | 16.12 | >.5 MPa at 29% strain | 0.144 MPa at 8.25% strain |
| 5g | 15.97 | .4 MPa at 38% strain | 0.103 MPa at 8.88% strain |
| 5h | 16.75 | >.5 MPa at 36% strain | 0.116 MPa at 10.88% strain |

As seen in Tables VA and VB, the low shear mixing samples produced using surfactant had thermal conductivity slurry took longer to prepare but once formed it acted very much like the slurry produced for laboratory scale samples.

The resulting composites (molded, pressed and dried as described, for instance, in Example 2 (Tables IIC and IID) had thermal conductivities of 18.14 and 20.99 mW/m-K. The slight increase in thermal conductivity can be explained most likely by the ratio of aerogel to binder used in the mixture which contained 10% less aerogel TLD101 than the standard recipe. More specifically, the ratio for the scaled-up samples was 22 g of binder per 100 g of aerogel in comparison to the standard 20 g binder per 100 g aerogel. The scale up composites had good strength While this invention has been particularly shown and described with references to preferred embodiments thereof, it will be understood by those skilled in the art that various changes in form and details may be made therein without departing from the scope of the invention encompassed by the appended claims.

What is claimed is:

1. A method for producing a self supporting rigid composite, the method comprising:
   (a) combining aerogel particles and an inorganic binder to form a slurry;
   (b) combining the slurry with a filamentary material, wherein the filamentary material has a filament length that is substantially preserved during a mixing process conducted to disperse the filamentary material in the slurry;
   (c) shaping the slurry or applying the slurry to a surface or into an opening; and
   (d) allowing the shaped slurry to harden, wherein at least part of the hardening process is conducted under compression, thereby producing a self supporting rigid composite having:
   a thermal conductivity that is no greater than about 50 mW/m·K at 23° C. and 1 atmosphere; and
   one or more mechanical properties selected from the group consisting of:
      (i) a flexural strength greater than about 0.05 MPa;
      (ii) a compressive strength greater than about 0.1 MPa; and
      (iii) an elastic modulus greater than about 0.5 MPa.

2. The method of claim 1, wherein the thermal conductivity is no greater than about 20 mW/m·K at 23° C. and 1 atmosphere.

3. The method of claim 1, wherein the flexural strength is greater than about 1 MPa.

4. The method of claim 1, wherein the compressive strength is greater than about 5 MPa.

5. The method of claim 1, wherein the elastic modulus is greater than about 2 MPa.

6. The method of claim 1, wherein the slurry further includes a surfactant.

7. The method of claim 1, wherein the binder is provided in a binder-containing composition.

8. The method of claim 1, wherein interparticle air is present in the composite in an amount that is less than about 30 volume %.

9. The method of claim 1, wherein the binder comprises a material selected from the group consisting of cement, lime, gypsum and combinations thereof.

10. The method of claim 1, wherein the binder is a cement, a mortar or a grout formulation.

11. The method of claim 1, wherein the filamentary material is selected from the group consisting of carbon fibers, mineral wool fibers, glass fibers, polymer-based fibers, metallic fibers, cellulose fibers, cotton fibers, wood fibers, hemp fibers and combinations thereof.

12. The method of claim 1, wherein the filamentary material is selected from the group consisting of woven fibers, non-woven fibers, chopped fibers, continuous fibers, mono-, bi-, or multi-component fibers, solid fibers and hollow fibers.

13. The method of claim 1, wherein the filamentary material includes fibers having a length to diameter aspect ratio that is greater than 1.

14. A method for producing a self supporting rigid composite, the method comprising:
   a) combining an aerogel-containing material and an inorganic binder to form a slurry;
   b) combining a filamentary material with the slurry through a mixing process that substantially preserves an initial filament length characterizing the filamentary material, thereby forming a mixture;
   c) shaping the mixture; and
   d) allowing mixture to harden, wherein at least part of the hardening process is conducted under compression, thereby producing the self supporting rigid composite, wherein the self supporting rigid composite has a thermal conductivity that is no greater than about 50 mW/m·K at 23° C. and 1 atmosphere.

15. The method of claim 14, wherein the filamentary material is selected from the group consisting of carbon fibers, mineral wool fibers, glass fibers, polymer-based fibers, metallic fibers, cellulose fibers, cotton fibers, wood fibers, hemp fibers and combinations thereof.

16. The method of claim 14, wherein the filamentary material is selected from the group consisting of woven fibers, non-woven fibers, chopped fibers, continuous fibers, mono-, bi-, or multi-component fibers, solid fibers and hollow fibers.

17. The method of claim 14, wherein the filamentary material includes fibers having a length to diameter aspect ratio that is greater than 1.

18. A method for producing a rigid composite, the method comprising:
   a) combining an aerogel-containing material and an inorganic binder to form a slurry;
   b) combining a filamentary material with the slurry through a mixing process that substantially preserves an initial filament length characterizing the filamentary material, thereby forming a mixture;
   c) applying the mixture to a substrate or into an opening; and
   d) allowing the applied mixture to harden, wherein the rigid composite has a thermal conductivity that is no greater than about 50 mW/m·K at 23° C. and 1 atmosphere; and
   one or more mechanical properties selected from the group consisting of:
      (i) a flexural strength greater than about 0.05 MPa;
      (ii) a compressive strength greater than about 0.1 M Pa; and
      (iii) an elastic modulus greater than about 0.5 MPa.

19. The method of claim 18, wherein the filamentary material is selected from the group consisting of carbon fibers, mineral wool fibers, glass fibers, polymer-based fibers, metallic fibers, cellulose fibers, cotton fibers, wood fibers, hemp fibers and combinations thereof.

20. The method of claim 18, wherein the filamentary material is selected from the group consisting of woven fibers, non-woven fibers, chopped fibers, continuous fibers, mono-, bi-, or multi-component fibers, solid fibers and hollow fibers.

21. The method of claim 18, wherein the filamentary material includes fibers having a length to diameter aspect ratio that is greater than 1.

* * * * *